(12) United States Patent
Tomizawa et al.

(10) Patent No.: US 11,869,394 B2
(45) Date of Patent: Jan. 9, 2024

(54) DISPLAY DEVICE

(71) Applicant: Japan Display Inc., Tokyo (JP)

(72) Inventors: Kazunari Tomizawa, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/109,041

(22) Filed: Feb. 13, 2023

(65) Prior Publication Data

US 2023/0260433 A1    Aug. 17, 2023

(30) Foreign Application Priority Data

Feb. 14, 2022    (JP) .................... 2022-020864

(51) Int. Cl.
*G09G 3/00*    (2006.01)
*G09G 3/36*    (2006.01)
*F21V 8/00*    (2006.01)

(52) U.S. Cl.
CPC ........... *G09G 3/001* (2013.01); *G02B 6/0035* (2013.01); *G09G 3/36* (2013.01); *G09G 2300/0439* (2013.01); *G09G 2320/0209* (2013.01); *G09G 2320/068* (2013.01)

(58) Field of Classification Search
CPC .. G09G 3/001; G09G 3/36; G09G 2300/0439; G09G 2320/0209; G09G 2320/068; G02B 6/0035
See application file for complete search history.

(56) References Cited

U.S. PATENT DOCUMENTS

| | | | |
|---|---|---|---|
| 7,385,574 B1 * | 6/2008 | Van de Ven | G09G 3/32 345/82 |
| 8,120,718 B2 | 2/2012 | Fukushima et al. | |
| 2010/0277657 A1 * | 11/2010 | Fukushima | G02B 30/27 349/15 |

FOREIGN PATENT DOCUMENTS

JP    3864762 B2    1/2007

* cited by examiner

*Primary Examiner* — Michael A Faragalla
(74) *Attorney, Agent, or Firm* — K&L Gates LLP

(57) ABSTRACT

According to an aspect, a display device includes: a liquid crystal display panel provided with a plurality of pixels; and a light source provided with a plurality of light emission points. The ratio of a pitch of the pixels arranged in a predetermined direction to a pitch of the light emission points arranged in the predetermined direction is 1:4n or 1:6n, and n is a natural number.

16 Claims, 16 Drawing Sheets

DISPLAY DEVICE

CROSS-REFERENCE TO RELATED APPLICATION

This application claims the benefit of priority from Japanese Patent Application No. 2022-020864 filed on Feb. 14, 2022, the entire contents of which are incorporated herein by reference.

BACKGROUND

1. Technical Field

What is disclosed herein relates to a display device.

2. Description of the Related Art

As described in Japanese Patent No. 3865762 (JP 3865762 B2), a display device capable of displaying individual images to a plurality of viewpoints by using an image separation body such as a parallax barrier has been known.

The configuration disclosed in JP 3865762 B2 employs a scheme in which a pixel used for image display to one of two viewpoints and a pixel used for image display to the other of the two viewpoints are simply alternately arranged in the arrangement direction of the two viewpoints. Crosstalk is likely to occur with such a scheme. Crosstalk is a phenomenon that part of an image intended as a display image to one of two viewpoints can be visually recognized from the other of the two viewpoints. With the configuration disclosed in JP 3865762 B2, the optical property of a panel serving as a parallax barrier is strictly restricted in order to reduce crosstalk, but such a complicated mechanism cannot be easily employed.

For the foregoing reasons, there is a need for a display device that can reduce crosstalk with a simpler configuration.

SUMMARY

According to an aspect, a display device includes: a liquid crystal display panel provided with a plurality of pixels; and a light source provided with a plurality of light emission points. The ratio of a pitch of the pixels arranged in a predetermined direction to a pitch of the light emission points arranged in the predetermined direction is 1:4n or 1:6n, and n is a natural number.

DETAILED DESCRIPTION

An embodiment of the present disclosure is described below with reference to the drawings. What is disclosed herein is only an example, and any changes that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference signs are applied to the same elements as those already described for the previously mentioned drawings, and detailed explanations may be omitted as appropriate.

Figure 1:
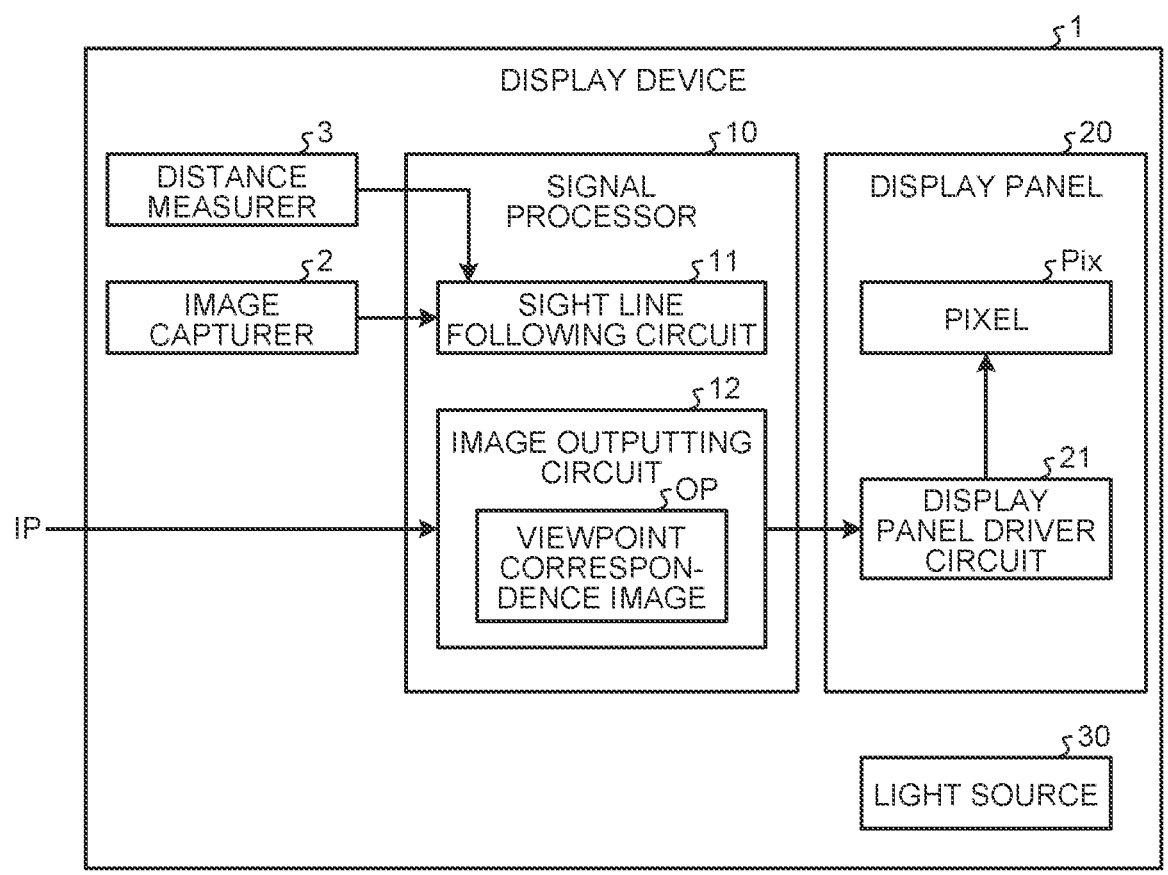
FIG. 1 is a block diagram illustrating a main configuration of a display device.

FIG. 1 is a block diagram illustrating a main configuration of a display device 1. The display device 1 includes an image capturer 2, a distance measurer 3, a signal processor 10, a display panel 20, and a light source 30. The display device 1 is an information processing device (information processing terminal device) such as a smartphone having an image capturing function achieved by the image capturer 2, a distance measurement function achieved by the distance measurer 3, and an image display function achieved by the signal processor 10, the display panel 20, and the light source 30.

The image capturer 2 captures an image. Specifically, the image capturer 2 includes an image capturing element such as a complementary metal oxide semiconductor (CMOS) image sensor. The image capturer 2 generates image data based on an electric signal output from the image capturing element.

The distance measurer 3 measures the distance between the display device 1 and a target to be image-captured that the image capturer 2 faces. Specifically, the distance measurer 3 includes, for example, a light emitting device and a light detector that constitute a time-of-flight (ToF) sensor. The distance measurer 3 including such a ToF sensor measures the distance based on the time difference between a light emission timing at which the light emitting device emits light and a sensing timing at which a laser beam emitted by the light emitting device and reflected by the target to be image-captured is sensed by the light detector. A specific mechanism with which the distance measurer 3 measures the distance is not limited to that described above but may be a mechanism using, for example, what is called contrast auto focus (AF) provided in a camera. In the mechanism, a distance determined as the distance of focusing on an image by the AF function of the image capturer 2 is obtained as the distance measured by the distance measurer 3. In the embodiment, the image capturer 2 and the distance measurer 3 cooperatively function as an acquirer configured to acquire information indicating the positions of two viewpoints (a first viewpoint E1 (right eye) and a second viewpoint E2 (left eye) to be described later) of a user opposite to the display panel 20.

The image capturer 2 is provided to capture an image of a user viewing an image display surface of the display panel 20. The distance measurer 3 is provided to measure the distance between the image display surface of the display panel 20 and the user viewing the image display surface. Specifically, the image capturer 2 and the distance measurer 3 are disposed on, for example, one surface side of a housing of the display device 1 on which the image display surface of the display panel 20 is exposed.

The signal processor 10 includes a sight line following circuit 11 and an image outputting circuit 12. The sight line following circuit 11 acquires information related to the position of a viewpoint of the user relative to the display panel 20 based on output from the image capturer 2 and the distance measurer 3. Details of the viewpoint position information will be described later.

The image outputting circuit 12 outputs, to the display panel 20, image data corresponding to the position of the viewpoint based on the viewpoint position information acquired by the sight line following circuit 11. The image data output from the image outputting circuit 12 is, for example, image data based on image signals IP input to the display device 1 from external information processing, but may be image data stored in advance in a storage device included in the display device 1. The image outputting circuit 12 generates a viewpoint correspondence image OP from the image data based on the image signal IP or from the image data stored in advance in the storage device included in the display device 1. The image outputting circuit 12 outputs, to the display panel 20, data of images corresponding to the viewpoint position acquired by the sight line following circuit 11, in the viewpoint correspondence image OP.

Figure 2:
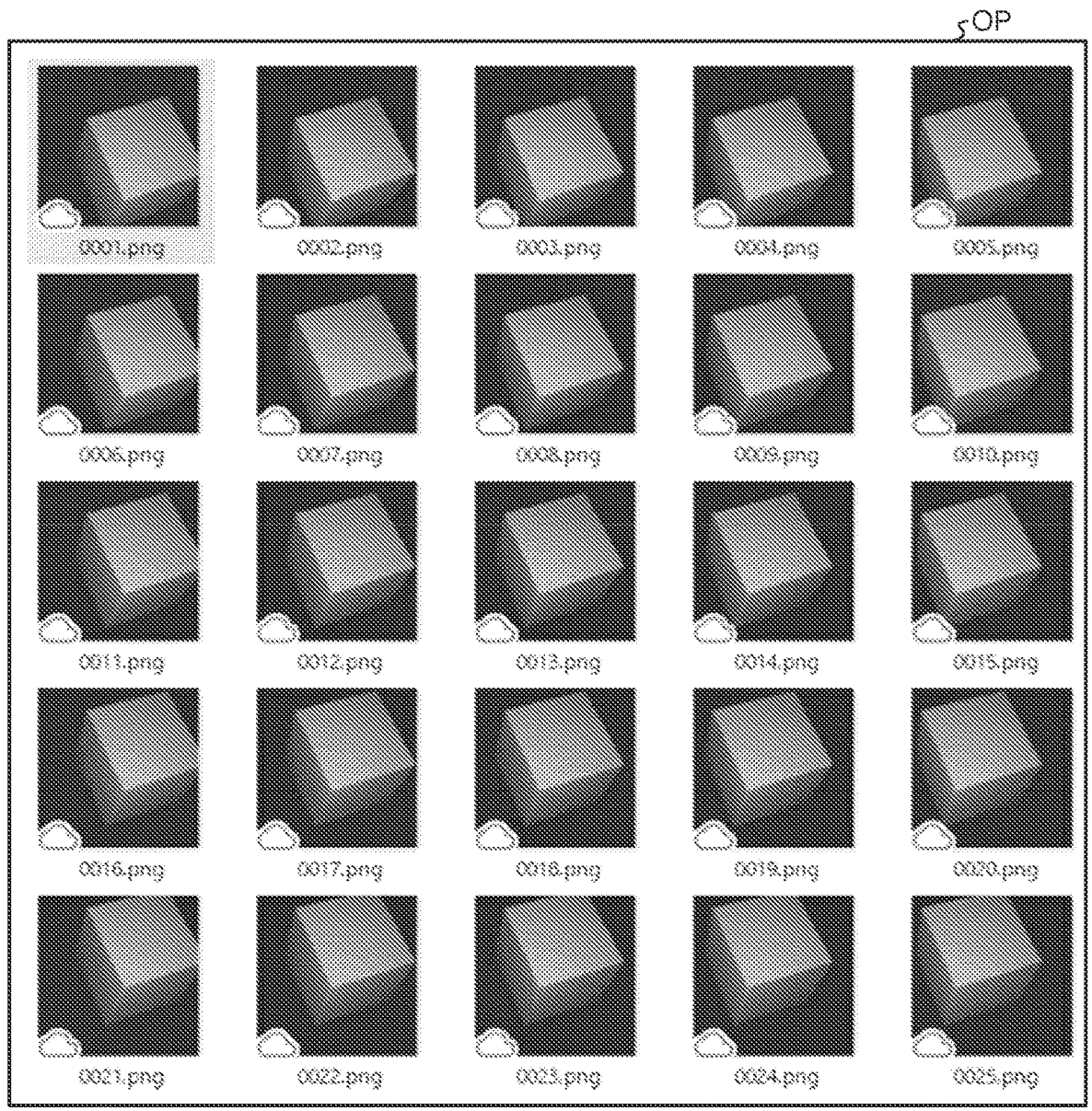
FIG. 2 is an example of a viewpoint correspondence image.

FIG. 2 is an example of the viewpoint correspondence image OP. As illustrated in FIG. 2, the viewpoint correspondence image OP includes a plurality of pieces of image data. The pieces of image data included in the viewpoint correspondence image OP correspond to different viewpoints (more specifically, viewpoints corresponding to one eye of a viewer). FIG. 2 exemplarily illustrates 25 pieces of data in the portable network graphics (PNG) format with sequential file names "0001" to "0025", but the file names, the format, and the number of images included in the viewpoint correspondence image OP are not limiting examples but are changeable as appropriate. The image outputting circuit 12 outputs, to the display panel 20, data of an image corresponding to the viewpoint position acquired by the sight line following circuit 11, in the viewpoint correspondence image OP including a plurality of images as exemplarily illustrated in FIG. 2.

As illustrated in FIG. 1, the display panel 20 includes a display panel driver circuit 21. The display panel driver circuit 21 includes a circuit such as a display driver integrated circuit (DDIC) configured to perform various kinds of processing related to image display on the display panel 20. The display panel driver circuit 21 drives a plurality of pixels Pix included in the display panel 20 in accordance with the image data output from the image outputting circuit 12.

Figure 3:
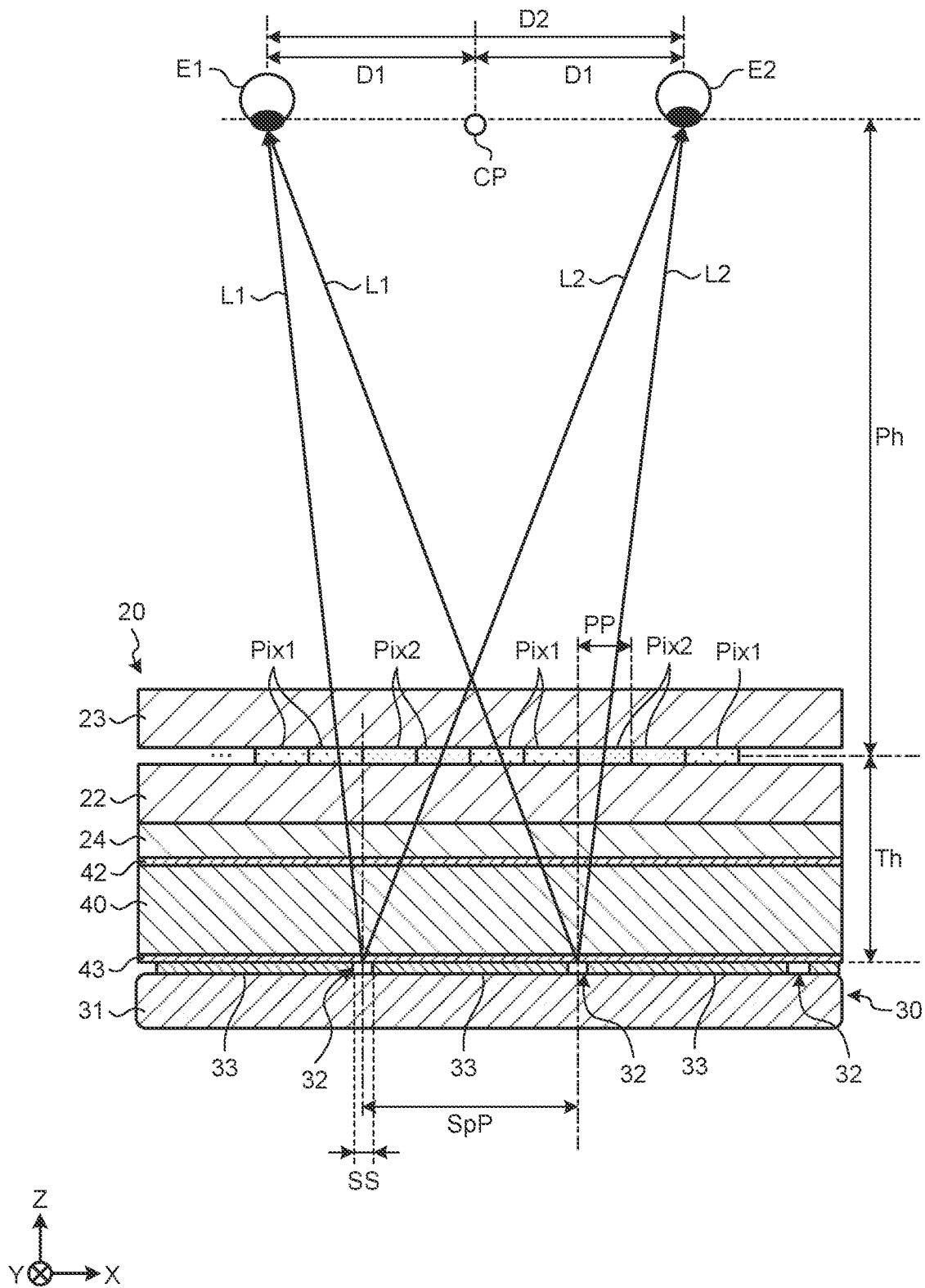
FIG. 3 is a schematic view illustrating a multilayered structure of a display panel.

FIG. 3 is a schematic view illustrating a multilayered structure of the display panel 20. As illustrated in FIG. 3, the display panel 20 includes a first substrate 22 and a second substrate 23. The first substrate 22 and the second substrate 23 are light-transmitting substrates such as glass substrates. The first substrate 22 and the second substrate 23 are stacked with a liquid crystal layer interposed therebetween. The liquid crystal layer is sealed between the first substrate 22 and the second substrate 23. The display panel 20 is what is called a liquid crystal display panel.

Hereinafter, a direction in which the first substrate 22 and the second substrate 23 face each other is defined as a Z direction. In addition, one of two orthogonal direction the Z direction is defined as an X direction, and the other direction is defined as a Y direction. The X direction and the Y direction are orthogonal to each other.

A multilayered structure is formed on a surface of the first substrate 22 on the second substrate 23 side. The multilayered structure is formed with, for example, a plurality of layers such as a first electrode layer in which a plurality of pixel electrodes are formed, a second electrode layer in which a common electrode provided with a reference potential for the pixels Pix is formed, a circuit formation layer in which a switching element for individually transmitting a signal to each pixel electrode, a wiring coupled to the switching element, and the like are formed, and insulating layers insulating these layers from one another. The pixel electrodes are individually provided at sub pixels included in each pixel Pix. Each pixel Pix is driven under control of the display panel driver circuit 21 and controlled so that the orientation of the liquid crystal molecule overlapping the position of each corresponding pixel electrode in a plan view twists in accordance with the potential difference between the common electrode and the pixel electrode. The term "plan view" means a front view of a plane (X-Y plane) orthogonal to the Z direction.

Although not illustrated, each pixel Pix includes a plurality of sub pixels. For example, each pixel Pix includes a sub pixel provided with a color filter that transmits light in red (R), a sub pixel provided with a color filter that transmits light in green (G), and a sub pixel provided with a color filter that transmits light in blue (B). It is not essential that each pixel Pix includes all of these sub pixels, and for example, one of two adjacent pixels Pix may include sub pixels in some colors among sub pixels in a plurality of colors, and the other pixel may include any other sub pixel. Some or all pixels Pix may include a sub pixel provided with a color filter that transmits light in a color different from the colors exemplarily described above. A sub pixel provided with a colorless filter or not provided with a color filter may be additionally provided, and light from this sub pixel is recognized as, for example, white (W). When each pixel Pix includes the above-described three sub pixels, the shape of the pixel Pix is preferably a square (with the same length in the X direction and the Y direction) but may be a rectangle in which either sides in the X direction or sides in the Y direction are longer than the other sides.

The second substrate 23 is provided with, for example, the color filters individually provided for the sub pixels included in each pixel Pix, and a black matrix that functions as a partition for the color filters of the sub pixels. The common electrode may be provided at the second substrate 23 instead of the first substrate 22.

A pixel pitch PP illustrated in FIG. 3 is the width in the X direction of a second pixel Pix2. Although a first pixel Pix1 and the second pixel Pix2 are differently illustrated in FIG. 3, the first pixel Pix1 and the second pixel Pix2 are pixels Pix having the same configuration with no difference therebetween. Thus, the width in the X direction of each pixel Pix is the pixel pitch PP. Precisely, the pixel pitch PP in the X direction is the distance between the X-directional central point of one side of the black matrix enclosing one pixel Pix and the X-directional central point of the other side thereof, wherein the one side is positioned on one end side of the one pixel Pix in the X direction, and the other side is positioned on the other end side of the one pixel Pix in the X direction.

The display panel 20 faces the light source 30 through a polarization layer 24 and a spacer 40. The polarization layer 24 is provided on the first substrate 22 side (display panel back surface side) of the display panel 20. The spacer 40 is a plate light-transmitting member disposed to face the first substrate 22 with the polarization layer 24 interposed therebetween, and is made of, for example, glass. A bonding layer 42 is interposed between the spacer 40 and the polarization layer 24. The bonding layer 42 bonds the polarization layer 24 to the spacer 40. When a support member for holding the interval between the light source 30 and the polarization layer 24 can be provided, a space layer may be provided therebetween.

As illustrated in, for example, FIG. 3, the light source 30 includes a surface light source 31, light emission points 32, and a light-shielding member 33. The surface light source 31 functions as a surface light source in which emits light from at least a surface on the display panel 20 side. As a specific configuration, the surface light source 31 includes a light guiding plate facing the display panel 20 in the Z direction, and a light source element (for example, a light emitting diode (LED)) configured to emit light to the light guiding plate in a direction orthogonal to the Z direction. Disposition of the surface light source 31 illustrated in FIG. 3 indicates disposition of the light guiding plate, and illustration of the light source element is omitted. The light emission points 32 are holes provided in the light-shielding member 33. The light-shielding member 33 covers the entire surface of the surface light source 31 on the spacer 40 side except for places at which the light emission points 32 are formed. A bonding layer 43 is interposed between the light-shielding member 33 and the spacer 40. The bonding layer 43 bonds the polarization layer 24 to the spacer 40. The bonding layers 42 and 43 are double-sided adhesive light-transmitting functional films such as optical clear adhesive (OCA). The light source 30 emits light generated by the surface light source 31 from the light emission points 32 to the display panel 20.

A light emission point pitch SpP illustrated in FIG. 3 is the interval between the central lines in the X direction of light emission points 32 adjacent to each other in the X direction. The light emission point pitch SpP is 4n or 6n times longer than the pixel pitch PP. The number n is a natural number. The number n is, for example, 1 but may be equal to or larger than 2. FIG. 3 exemplarily illustrates a case in which the light emission point pitch SpP is four times longer than the pixel pitch PP. An opening diameter SS illustrated in FIG. 3 is the opening diameter of each light emission point 32 in the plan view. The opening diameter SS is equal to or shorter than the pixel pitch PP. More specifically, the planar shape of each light emission point 32 is preferably the same as the shape of each pixel Pix or a similar shape smaller than each pixel Pix (refer to FIG. 11, for example).

As described above, the image outputting circuit 12 outputs, to the display panel 20, the image data corresponding to the viewpoint position acquired by the sight line following circuit 11 in the viewpoint correspondence image OP. Hereinafter, unless otherwise stated, an image means an image displayed on the display panel 20 in accordance with the image data output from the image outputting circuit 12. The display panel 20 performs display corresponding to the image data. Thus, the display panel 20 displays an image corresponding to the viewpoint position acquired by the sight line following circuit 11. FIG. 3 schematically illustrates the display panel 20 in a state in which images corresponding to the first viewpoint E1 and the second viewpoint E2 are displayed. The first pixel Pix1 is a pixel Pix controlled to display the image corresponding to the first viewpoint E1. The second pixel Pix2 is a pixel Pix controlled to display the image corresponding to the second viewpoint E2.

The first viewpoint E1 corresponds to the right eye of a user. The second viewpoint E2 corresponds to the left eye of the user. A middle point CP is the middle point of a straight line between the first viewpoint E1 and the second viewpoint E2. The position of the middle point CP typically corresponds to the position of the nose of the user in a direction in which the first viewpoint E1 and the second viewpoint E2 are arranged. FIG. 3 illustrates a case in which the first viewpoint E1 and the second viewpoint E2 are arranged in the X direction. Assume that the distance in the X direction between the first viewpoint E1 and the middle point CP, and the distance in the X direction between the second viewpoint E2 and the middle point CP are each a distance D1, and the distance in the X direction between the first viewpoint E1 and the second viewpoint E2 is a distance D2. In this case, the distance D2 is two times longer than the distance D1.

Coordinates indicating the position of the middle point CP with respect to a predetermined origin of the display panel 20 can be expressed as (pos_x, pos_y, pos_h). The coordinate pos_x is the coordinate of the middle point CP in the X direction. The coordinate pos_y is the coordinate of the middle point CP in the Y direction. The coordinate pos_h is the position of the middle point CP in the Z-direction. The coordinates in the X and Y directions of the predetermined origin of the display panel 20 may correspond to, for example, the positions of one of the four apexes of a display region that is rectangular in the plan view and includes the pixels Pix disposed in the display panel 20. The coordinate in the Z direction of the predetermined origin of the display panel 20 corresponds to the position of the central point of a pixel Pix (for example, the first pixel Pix1 or the second pixel Pix2 illustrated in FIG. 3) in the Z-direction (in the thickness direction). The positions of the predetermined origin of the display panel 20 are not limited thereto but may be arbitrary positions. Hereinafter, unless otherwise stated, the term "origin" means the predetermined origin of the display panel 20.

The sight line following circuit 11 determines the positions of the two eyes (right and left eyes) of the user in an image captured by the image capturer 2. The determination is performed based on, for example, pattern matching, but the present disclosure is not limited thereto and the determination may be performed based on, for example, image identification using machine learning or the like. Information indicating the relation between a position in the image capturing area of the captured image and coordinates in the X and Y directions is held by the signal processor 10 in advance and prepared to be referred by the sight line following circuit 11. The sight line following circuit 11 sets, as the middle point CP, the middle point between the right and left eyes in the image captured by the image capturer 2 and determines the coordinates of the middle point CP in the X and Y directions. Such a method of determining the position of the middle point CP is merely exemplary, the present disclosure is not limited thereto, and the method is changeable as appropriate. For example, the sight line following circuit 11 may determine the middle point CP based on the positional relation among the positions of the two eyes (right and left eyes) of the user included in the image captured by the image capturer 2 and the position of the nose of the user. The sight line following circuit 11 acquires, as the value of pos_h, the value of the distance measured by the distance measurer 3. The sight line following circuit 11 determines, as the middle point CP, the middle point between the right and left eyes in the image captured by the image capturer 2 and sets the position of the middle point CP in the Z direction as pos_h. In this manner, the sight line following circuit 11 derives the viewpoint position information.

Light emitted from each light emission point 32 reaches the first viewpoint E1 and the second viewpoint E2. The first pixel Pix1 is positioned on an emission line L1 of the light from each light emission point 32 to the first viewpoint E1. The second pixel Pix2 is positioned on an emission line L2 of the light from each light emission point 32 to the second viewpoint E2. An image output by the first pixel Pix1 and an image output by the second pixel Pix2 are different from each other. The image output by the first pixel Pix1 corresponds to the position of the first viewpoint E1. The image output by the second pixel Pix2 corresponds to the position of the second viewpoint E2. More specifically, for example, the image of 0014.png in FIG. 2 is employed as a right-eye viewpoint image, the image of 0012.png is employed as a left-eye viewpoint image, and these images are combined by the signal processor and displayed as one image (stereoscopic display image). Furthermore specifically, for example, on condition that a stereoscopic display image, the image 0014.png, and the image 0012.png have the same number of pixels, when a left-eye image, a left-eye image, a right-eye image, and a right-eye image need to be sequentially displayed at pixels (n, m+1), (n, m+2), (n, m+3), (n, m+4) of a pixel row in the stereoscopic display image, pixels (signals) corresponding to (n, m+1) and (n, m+2) of the stereoscopic display image use pixel signals corresponding to (n, m+1) and (n, m+2) from the image 0012.png as the left-eye image. Similarly, pixels (signals) corresponding to (n, m+3) and (n, m+4) of the stereoscopic display image use pixel signals corresponding to (n, m+3) and (n, m+4) from the image 0014.png as a right-eye image. There may be a pixel Pix that does not need to display any images, depending on the relation between the viewpoint position of the user and each light source (light emission point 32). In such a case, the pixel Pix displays an image having lowest luminance (for example, black image). The image outputting circuit 12 outputs image data including image data corresponding to each of a plurality of viewpoints (for example, the first viewpoint E1 and the second viewpoint E2) to the display panel 20 so that such a mixed image is displayed.

The distance in the Z direction between the central line in the Z direction of each pixel Pix and the middle point CP can be expressed as a distance Ph. The magnitude of the distance Ph corresponds to the magnitude of the value of pos_h described above. The distance in the Z direction between the central line in the Z direction of each pixel Pix and the start point of light emission from the light emission points 32 can be expressed as a distance Th. The central line in the Z direction of each pixel Pix is the central line in the Z direction of the liquid crystal layer sealed between the first substrate 22 and the second substrate 23 and is set preferably, for example, at a height position of d/2 when d represents a cell gap of the display panel 20. The distance Th is significantly shorter than the distance Ph. Thus, the central line in the Z direction of each pixel Pix may be defined on the same plane as the pixel electrodes or may be defined on the same plane as the back or front surface of the second substrate 23 or the front surface of a cover glass provided on the display panel 20. In the embodiment, the position in the Z direction of the emission start point of the light from the light emission point 32 is on the boundary line between the light-shielding member 33 and the bonding layer 43.

Figure 4:
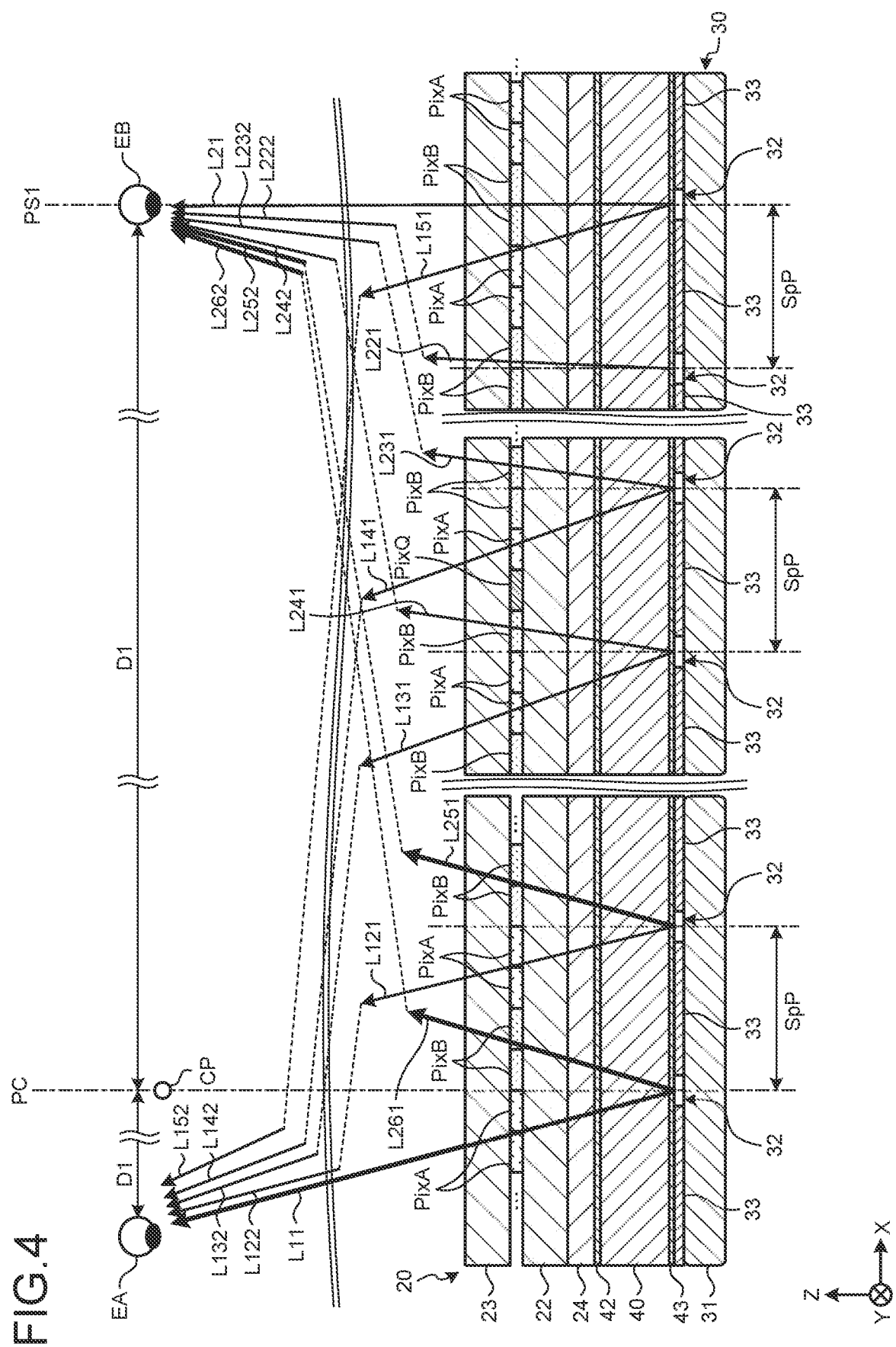
FIG. 4 is a sectional view illustrating an example in which a light emission point pitch is four times longer than a pixel pitch.
Figure 5:
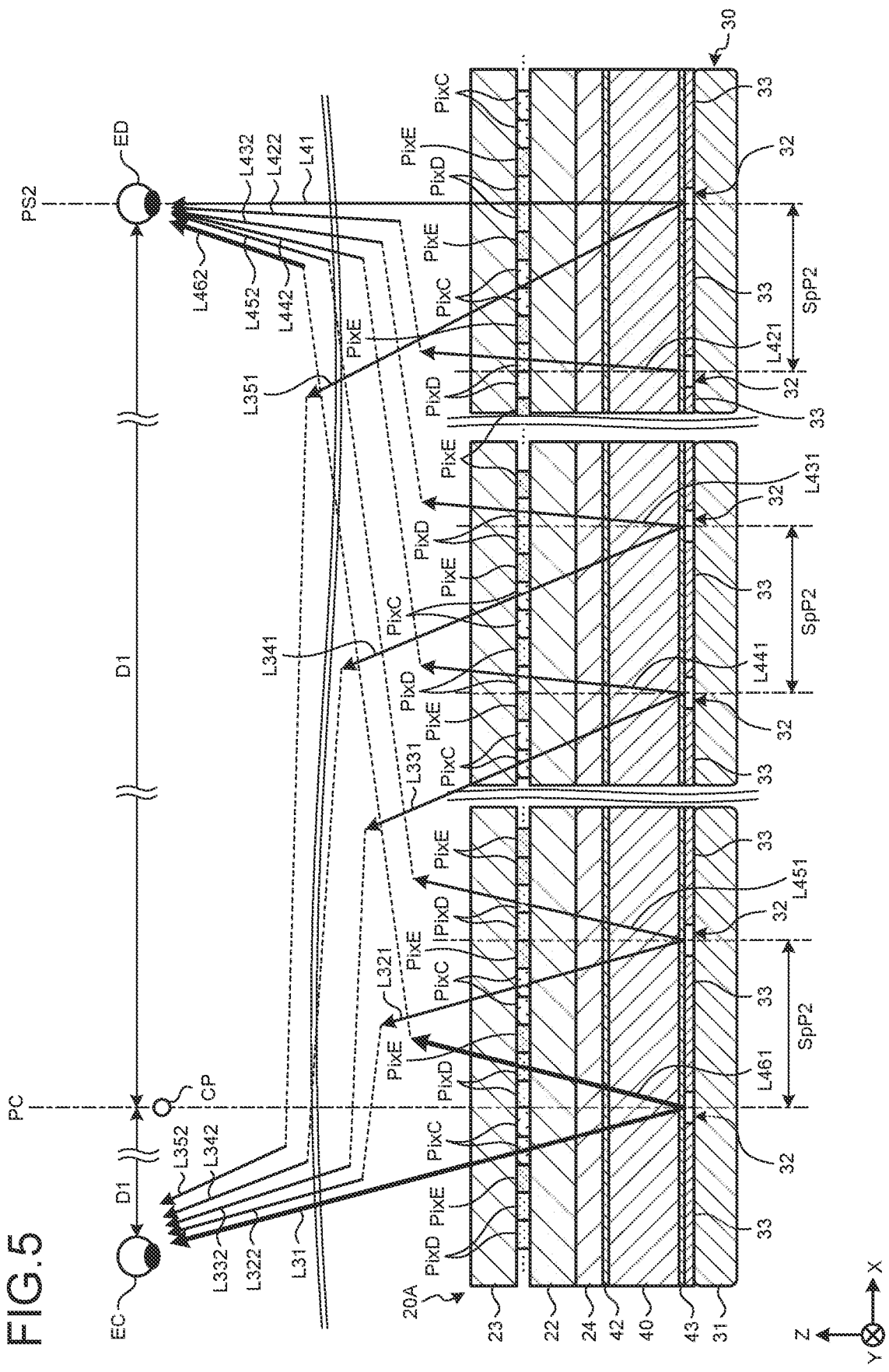
FIG. 5 is a sectional view illustrating an example in which the light emission point pitch is six times longer than the pixel pitch.
Figure 6:
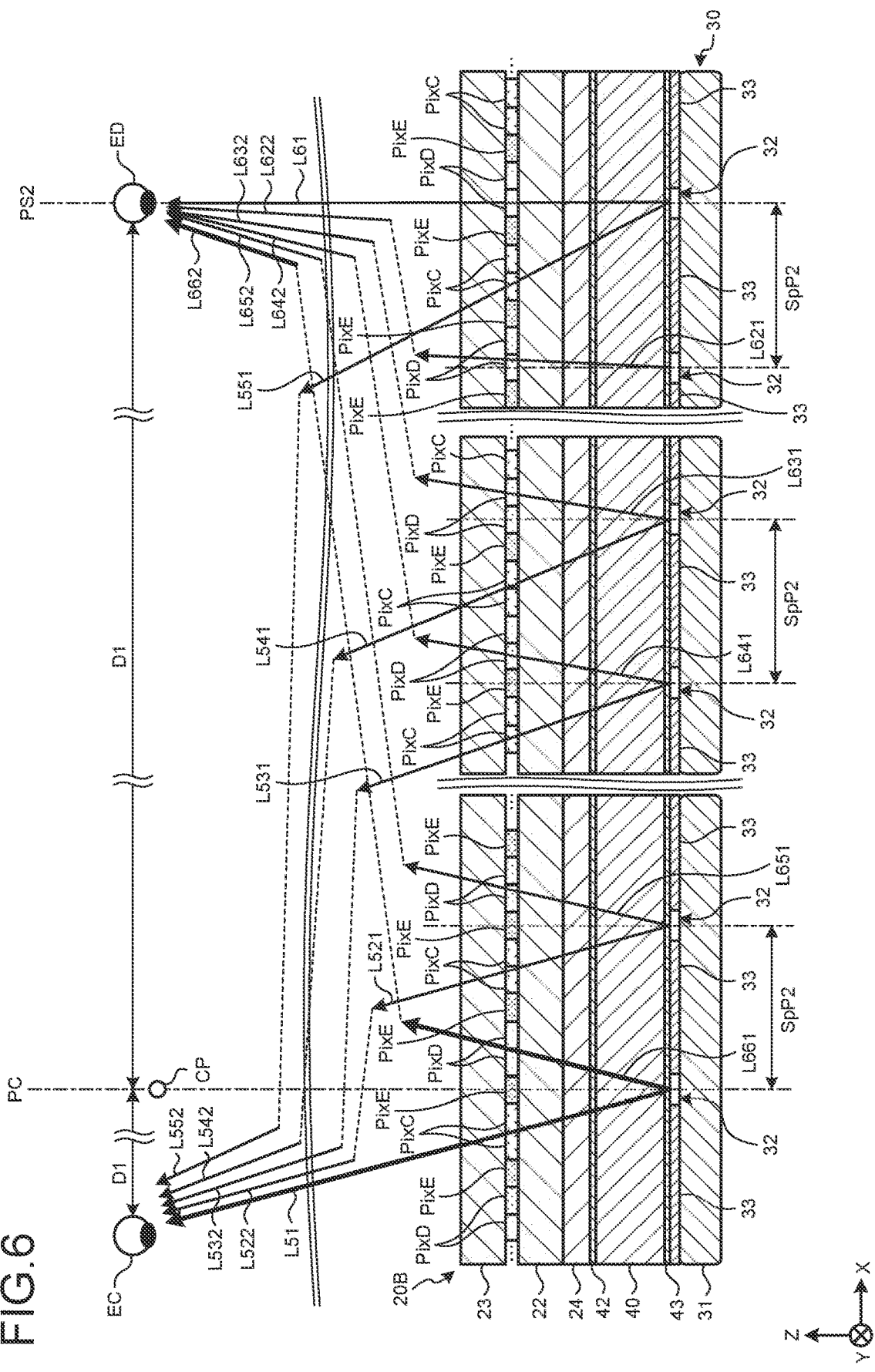
FIG. 6 is a sectional view illustrating another example in which the light emission point pitch is six times longer than the pixel pitch.

The following describes, with reference to sectional views illustrated in FIGS. 4 to 6, the relation between the light emission point pitch SpP that is a pitch of the light emission points 32 adjacent to each other in the X direction and the pitch of the pixels Pix arranged in the X direction, and the relation between the light emission point pitch SpP and light emitted from the light emission points 32 to the respective viewpoints. In the same manner as FIG. 3, the sectional views illustrated in FIGS. 4 to 6 are sectional views illustrating a section of the display panel 20 along a plane (X-Z plane) orthogonal to the Y direction.

FIG. 4 is a sectional view illustrating an example in which the light emission point pitch SpP is four times longer than the pixel pitch PP. In FIG. 4 and other figures to be referred in description of the embodiment, an emission line L(m)1 and an emission line L(m)2 coupled to each other through a dashed line constitute one emission line of light in reality. For example, the emission line L121 is part of the emission line L(m)1 in the case of m=12 and indicates the emission line just having emitted from one light emission point 32. The emission line L122 is part of the emission line L(m)2 in the case of m=12 and indicates that the emission line is reaching a first viewpoint EA. The distance between the display panel 20 and a viewpoint is significantly longer than the pixel pitch PP and the like, and the illustration manner applied to FIGS. 4 to 6 in the following description is a way of illustrating their relation in one diagram. In FIG. 4, m is a natural number of 12 to 15 or a natural number of 22 to 25. When m is a natural number of 12 to 15, the emission line passes through a first pixel PixA and reaches the first viewpoint EA. When m is a natural number of 22 to 25, the emission line passes through a second pixel PixB and reaches a second viewpoint EB. Hereinafter, an emission line L(m) collectively means the emission line L(m)1 and the emission line L(m)2. For example, the emission line L12 collectively means the emission line L121 and the emission line L122.

The first viewpoint EA is one of the first viewpoint E1 and the second viewpoint E2 (refer to FIG. 3). The second viewpoint EB is the other of the first viewpoint E1 and the second viewpoint E2. When the first viewpoint EA is the first viewpoint E1, the first pixel PixA is the first pixel Pix1 (refer to FIG. 3). When the second viewpoint EB is the second viewpoint E2, the second pixel PixB is the second pixel Pix2 (refer to FIG. 3).

As illustrated in FIG. 4, the display panel 20 has a configuration in which four pixels Pix are arranged in the light emission point pitch SpP that is the interval between the central lines in the X direction of two light emission points 32 adjacent to each other in the X direction. In the plan view, the positions in the X direction of the central lines in the X direction of the two light emission points 32 overlap the position in the X direction of the boundary line between two pixels Pix adjacent to each other in the X direction.

In most cases, two pixels Pix among the four pixels Pix are controlled as the first pixels PixA. The other two pixels Pix among the four pixels Pix are controlled as the second pixels PixB.

As illustrated with the emission line L21, the emission line of light reaching the second viewpoint EB through a second pixel PixB opposite to the second viewpoint EB in the Z direction extends in the Z direction. In other words, the emission line of light from a light emission point 32 opposite to the second viewpoint EB in the Z direction extends in the Z direction. In FIG. 4, a line extending in the Z direction and passing through the second viewpoint EB is illustrated as a dashed and single-dotted line PS1. When the first light emission point 32 which emits light of the emission line L21 is assumed as a reference point, light reaching the second viewpoint E2 from a second light emission point 32 at a position separated in the X direction from the first light emission point 32 has an emission line at a larger tilt angle relative to the Z direction as the distance from the first light emission point 32 in the X direction is longer, as illustrated with the emission lines L22, L23, L24, L25, and L26. Among the plurality of pixels Pix, pixels Pix to be controlled as second pixels PixB are determined based on such emission lines of light. Similarly, as indicated by the relation between the emission line L11, L12, L13, L14, L15, or L16 and the corresponding first pixel PixA, among the plurality of pixels Pix, pixels Pix to be controlled as first pixels PixA are determined based on the emission lines of light emitted from the light emission points 32 and reaching the first viewpoint EA.

Depending on the difference between the tilt angles of the emission lines L22, L23, L24, L25, and L26 relative to the Z direction, there are places where disposition of every two pixels Pix in the X direction is not necessarily appropriate as the disposition in the X direction of pixels Pix to be controlled as second pixels PixB. Similarly, there are places where disposition of every two pixels Pix in the X direction is not necessarily appropriate as the disposition in the X direction of pixels Pix to be controlled as first pixels PixA. In FIG. 4, a pixel PixQ positioned between the emission line L141 and the emission line L241 can be the first pixel PixA or the second pixel PixB. Such a pixel Pix may be the first pixel PixA or the second pixel PixB but may be a pixel Pix that does not contribute to image display like a third pixel PixE to be described later. When the pixel PixQ is set as a pixel Pix that does not contribute to image display, it is possible to more reliably reduce the probability of crosstalk occurrence due to the mixing of a component of the first pixel PixA in the emission line L241 and the probability of crosstalk occurrence due to the mixing of a component of the second pixel PixB in the emission line L141.

When the pixel PixQ is set as the first pixel PixA or the second pixel PixB, the pixel PixQ is preferably set as the same pixel as one of the first pixel PixA and the second pixel PixB that are adjacent to the pixel PixQ, the one passing light that travels toward the assumed viewpoint and has an emission line forming the larger angle relative to the Z direction. In the example illustrated in FIG. 4, the angle of the emission line L141 of light passing through the first pixel PixA adjacent to the pixel PixQ relative to the Z direction is larger than the angle of the emission line L241 of light passing through the second pixel PixB adjacent to the pixel PixQ relative to the Z direction. Thus, in this example, when the pixel PixQ is set as a first pixel PixA or a second pixel PixB, the pixel PixQ is preferably set as the first pixel PixA.

In FIG. 4, the middle point CP is positioned on a dashed and single-dotted line PC overlapping the central line in the X direction of one light emission point 32, but it is not essential that the middle point CP is a position overlapping the central line in the X direction of the light emission point 32. The correspondence relation between the following: light from each light emission point 32; the positional relation of the first viewpoint EA and the second viewpoint EB in accordance with the position of the middle point CP; and control of each pixel Pix as the first pixel PixA or the second pixel PixB, is as described above with reference to FIG. 4 irrespective of the position of the middle point CP.

FIG. 5 is a sectional view illustrating an example in which a light emission point pitch SpP2 is six times longer than the pixel pitch PP. In FIG. 5 and FIG. 6 to be described later, the interval between the central lines in the X direction of the light emission points 32 adjacent to each other in the X direction is the light emission point pitch SpP2. In FIG. 5, m is a natural number of 32 to 35 or a natural number of 42 to 45. The emission line of light when m is a natural number of 32 to 35 and the emission line L31 are each the emission line of light passing through a first pixel PixC and reaching the first viewpoint EC. The emission line of light when m is a natural number of 42 to 45 and the emission line L41 are each the emission line of light passing through a second pixel PixD and reaching a second viewpoint ED. In FIGS. 5 and 6, a line extending in the Z direction and passing through the second viewpoint ED is illustrated as a dashed and single-dotted line PS2.

A first viewpoint EC is one of the first viewpoint E1 and the second viewpoint E2 (refer to FIG. 3). The second viewpoint ED is the other of the first viewpoint E1 and the second viewpoint E2. When the first viewpoint EC is the first viewpoint E1, the first pixel PixC is the first pixel Pix1 (refer to FIG. 3). When the second viewpoint ED is the second viewpoint E2, the second pixel PixD is the second pixel Pix2 (refer to FIG. 3). Description with reference to FIG. 5 will be mainly made on any difference from FIG. 4. The understanding of the positional relation among light, a pixel Pix, and a viewpoint as described above with reference to FIG. 4 is also applicable to configurations illustrated in FIGS. 5 and 6, and thus detailed description thereof is omitted.

As illustrated in FIG. 5, a display panel 20A has a configuration in which six pixels Pix are arranged in the light emission point pitch SpP2 that is the interval between the central lines in the X direction of two light emission points 32 adjacent to each other in the X direction. In the plan view, the positions in the X direction of the central lines in the X direction of two light emission points 32 overlap the position in the X direction of the boundary line between two pixels Pix adjacent to each other in the X direction.

In most cases, two pixels Pix out of the six pixels Pix are controlled as the first pixels PixC. Other two pixels Pix out of the six pixels Pix are controlled as the second pixels PixD. Pixels Pix that are neither the first pixels PixC nor the second pixels PixD included in the six pixels Pix are controlled as the third pixels PixE. The third pixel PixE is a pixel Pix that is set so as to have the lowest degree of light transmission (for example, black display). The display panel 20A has the same configuration as the display panel 20 except for the above stated configuration.

FIG. 6 is a sectional view illustrating another example in which the light emission point pitch SpP2 is six times longer than the pixel pitch PP. In FIG. 6, m is a natural number of 52 to 55 or a natural number of 62 to 65. The emission line of light when m is a natural number of 52 to 55 and the emission line L51 are each the emission line of light passing through a first pixel PixC and reaching the first viewpoint EC. The emission line of light when m is a natural number of 62 to 65 and the emission line L61 are each the emission line of light passing through a second pixel PixD and reaching the second viewpoint ED. Description with reference to FIG. 6 will be mainly made on any difference from FIG. 5.

In a display panel 20B, as in the display panel 20A, the ratio of the length in the X direction of the light emission point pitch SpP2 to the length in the X direction of the pixel pitch PP is 6:1. In the display panel 20B, unlike the display panel 20A, the position in the X direction of the central line in the X direction of each light emission point 32 overlaps the position of the central line in the X direction of a pixel Pix in the plan view. In other words, the display panel 20B has a configuration obtained by shifting the relative positional relation in the X direction in the plan view between each pixel Pix and each light emission point 32 in the display panel 20A by half of a pixel Pix in the X direction. The display panel 20B has the same configuration as the display panel 20A except for the above-stated configuration.

The following describes drive control of pixels Pix in accordance with the relative positional relation between a viewpoint and the emission start point of light with reference to FIGS. 7 to 15.

Figure 7:
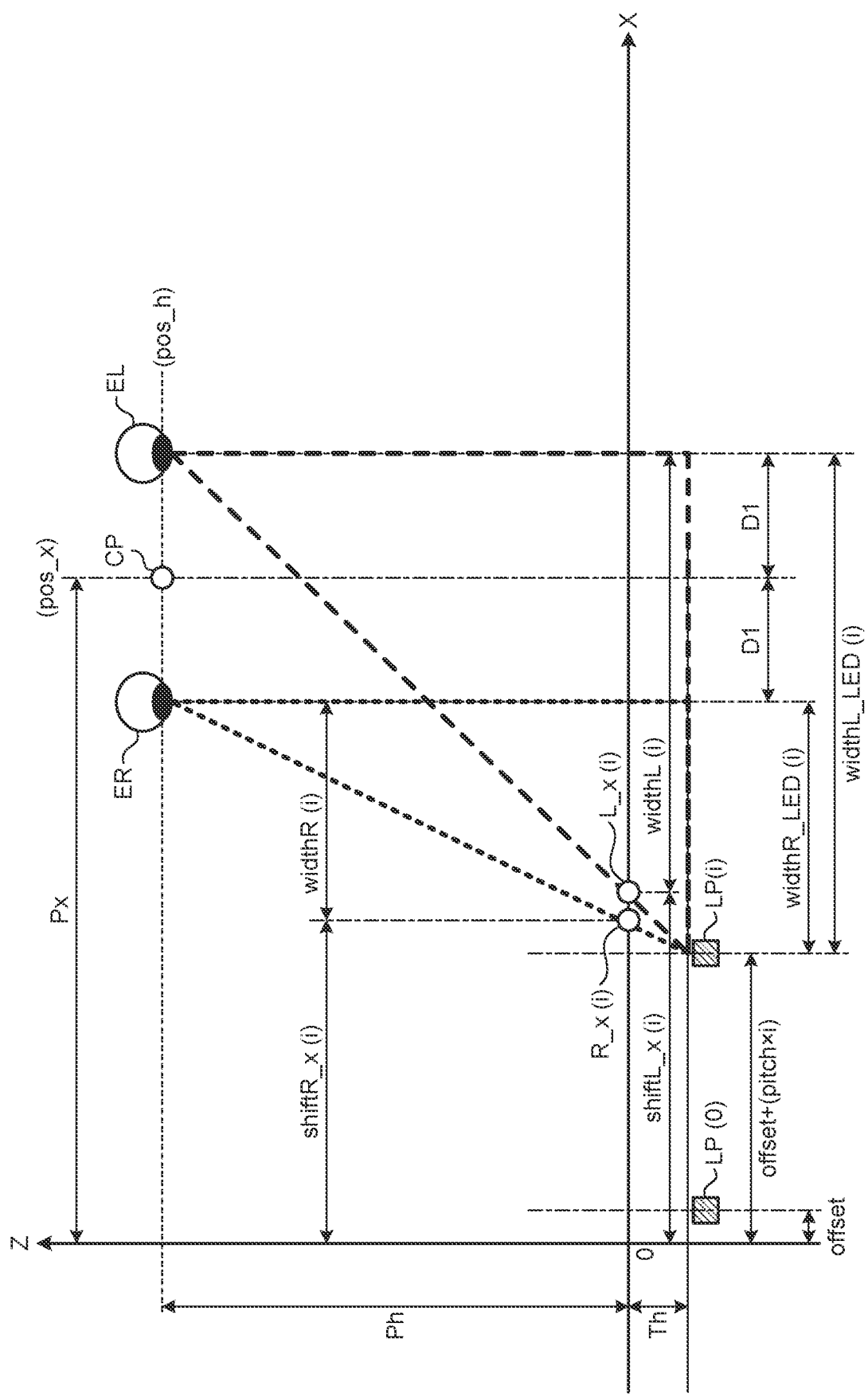
FIG. 7 is a diagram illustrating various parameters related to determination of the coordinate in an X direction of a pixel positioned on the emission line of light between a light emission point of light from the (i+1)-th light source with respect to the origin in the X direction and a viewpoint.

FIG. 7 is a diagram illustrating various parameters related to determination of the coordinate $R\_x(i)$ or $L\_x(i)$ in the X direction of a pixel Pix positioned on the emission line extending from a light emission point $LP(i)$ that is the $(i+1)$-th light emission point counted from the origin in the X direction to the corresponding one of viewpoints ER and EL.

The light emission point $LP(0)$ illustrated in FIG. 7 indicates the emission start point of light from a light source point (for example, a light emission point 32) disposed at the closest (first) position to the origin in the X direction. The light emission point $LP(i)$ indicates the emission start point of light from a light source point disposed at the $(i+1)$-th closest position to the origin in the X direction. For example, in a case of $i=1$, the light emission point $LP(1)$ indicates the emission start point of light from a light source point disposed at the closest position next to the light emission point $LP(0)$ to the origin in the X direction, which means that the light emission point $LP(1)$ indicates the secondary closest position. Thus, i is an integer equal to or larger than zero.

In FIG. 7, the distance in the X direction between the origin and the light emission point $LP(0)$ is denoted by "offset". The distance in the X direction between the origin and the light emission point $LP(i)$ can be expressed as "offset+(pitch×i)". The magnitude of the value of "pitch" corresponds to the magnitude of the light emission point pitch SpP or the magnitude of the light emission point pitch SpP2 described above. The values "offset" and "offset+(pitch×i)" are values determined in advance in accordance with the design of the display device 1 and are parameters that can be referred in calculation related to determination of the coordinates $R\_x(i)$ and $L\_x(i)$ in the X direction.

The magnitude of the distance Ph, which is described above with reference to FIG. 3 and illustrated in FIG. 7, corresponds to the magnitude of the value of pos_h. The magnitude of a distance Px illustrated in FIG. 7 corresponds to the magnitude of the value of pos_x. The distance in the Z direction between the origin and each of the light emission point $LP(0)$ and the light emission point $LP(i)$ is the distance Th described above. The values of pos_h and pos_x can be acquired by the image capturer 2 and the distance measurer 3.

Hereinafter, the distance in the X direction between the origin and the coordinate $R\_x(i)$ is denoted by $shiftR\_x(i)$. The distance in the X direction between the coordinate $R\_x(i)$ and the viewpoint ER is denoted by $widthR(i)$. The distance in the X direction between the light emission point $LP(i)$ and the viewpoint ER is denoted by $widthR\_LED(i)$. The viewpoint ER is the right-eye viewpoint of the user and is one of the first viewpoint E1 and the second viewpoint E2 (refer to FIG. 3).

The distance in the X direction between the origin and the coordinate $L\_x(i)$ is denoted by $shiftL\_x(i)$. The distance in the X direction between the coordinate $L\_x(i)$ and the viewpoint EL is denoted by $widthL(i)$. The distance in the X direction between the light emission point $LP(i)$ and the viewpoint EL is denoted by $widthL\_LED(i)$. The viewpoint EL is the left-eye viewpoint of the user and is the other of the first viewpoint E1 and the second viewpoint E2 (refer to FIG. 3).

The value $widthR\_LED(i)$ can be expressed as Expression (1) below. In Expression (1) and other expressions, D1 is a value indicating the magnitude of the distance D1 described above with reference to FIG. 3 and illustrated in FIG. 7. The value indicating the magnitude of the distance D1 may be predetermined based on the average value of typical users. In the embodiment, the distance D1 is, for example, 31.25 millimeters (mm), but the present disclosure is not limited thereto and the distance D1 is changeable as appropriate.

$$\text{width}R\_LED(i)=\text{pos}\_x-D1-\{\text{offset}+(\text{pitch}\times i)\} \quad (1)$$

The value widthR(i) can be expressed as Expression (2) below. In Expression (2) and other expressions, Th is a value indicating the magnitude of the distance Th. The distance Th is determined in advance in accordance with the design of the display device 1. A method of determining the distance Th in designing will be described later.

$$\text{width}R(i)=\text{width}R\_LED(i)\times\text{pos}\_h/(\text{pos}\_h+Th) \quad (2)$$

The value shiftR_x(i) can be expressed as Expression (3) below.

$$\text{shift}R\_x(i)=\text{pos}\_x-D1-\text{width}R(i) \quad (3)$$

The value R_x(i) can be expressed as Expression (4) below. In Expression (4) and other expressions, PP is a value indicating the magnitude of the pixel pitch PP. The pixel pitch PP is determined in advance in accordance with the design of the display device 1. In Expression (4) and other expressions, int( ) represents calculation of an integer value obtained by rounding a value in the parentheses off to the closest whole number.

$$R\_x(i)=\text{int}(\text{shift}R\_x(i)/PP) \quad (4)$$

The value widthL_LED(i) can be expressed as Expression (5) below.

$$\text{width}L\_LED(i)=\text{pos}\_x+D1-\{\text{offset}+(\text{pitch}\times i)\} \quad (5)$$

The value widthL(i) can be expressed as Expression (6) below.

$$\text{width}L(i)=\text{width}L\_LED(i)\times\text{pos}\_h/(\text{pos}\_h+Th) \quad (6)$$

The value shiftL_x(i) can be expressed as Expression (7) below.

$$\text{shift}L\_x(i)=\text{pos}\_x+D1-\text{width}L(i) \quad (7)$$

The value L_x(i) can be expressed as Expression (8) below.

$$L\_x(i)=\text{int}(\text{shift}L\_x(i)/PP) \quad (8)$$

Figure 8:
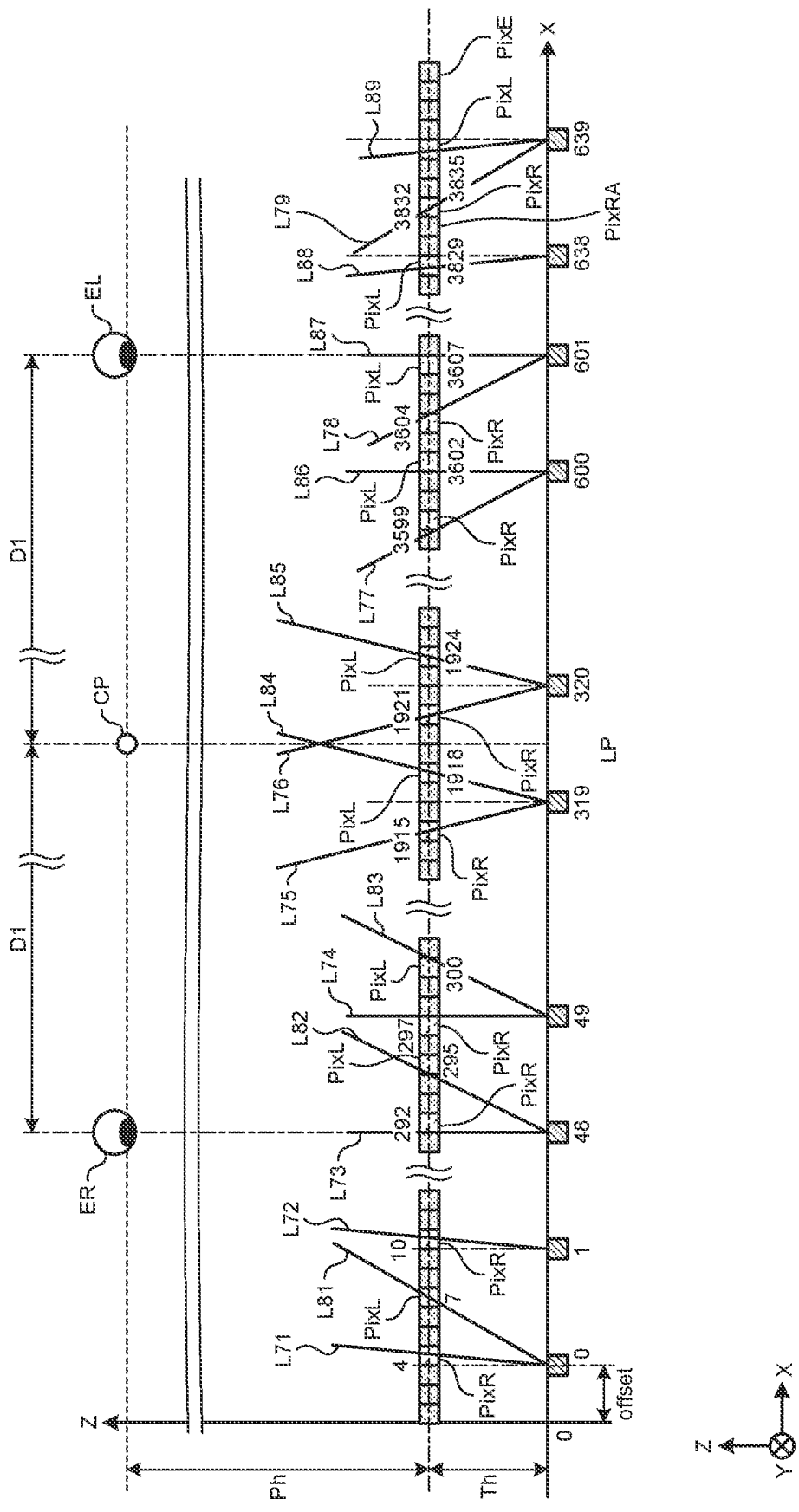
FIG. 8 is a schematic diagram illustrating the positional relation between third pixels and first and second pixels controlled in accordance with coordinates derived based on Expressions (1) to (8) described with reference to FIG. 7.

FIG. 8 is a schematic diagram illustrating the positional relation between third pixels PixE and first pixels PixR and second pixels PixL controlled in accordance with R_x(i) and L_x(i) derived based on Expressions (1) to (8) described with reference to FIG. 7. The examples illustrated in FIG. 8 and FIG. 10 to be described later correspond to an exemplary configuration in which 640 light emission points LP are arranged in the X direction, and the value "0" in the parentheses of the light emission point LP(0) and some values (1, 48, 49, 319, 320, 600, 601, 638, and 639) of the index i of the light emission point LP(i) are illustrated in the horizontal direction. Hereinafter, a light emission point LP means the light emission point LP(0) or the light emission point LP(i) unless otherwise stated. Further the example indicates that, among pixels Pix arranged in the X direction with the origin as a starting point, which pixel Pix is positioned on the emission line of light from a light emission point LP to the viewpoint ER or EL. Each first pixel PixR is a pixel Pix positioned on the emission line L71, L72, . . . , or L79 of light from a light emission point LP to the viewpoint ER. Each second pixel PixL is a pixel Pix positioned on the emission line L81, L82, . . . , or L89 of light from a light emission point LP to the viewpoint EL. Any pixel Pix that is neither a first pixel PixR nor a second pixel PixL is controlled as a third pixel PixE.

For example, the number "4" illustrated near the first pixel PixR indicates that the emission line L71 of light emitted from the light emission point LP(0) and reaching the viewpoint ER passes through a first pixel PixR at the fourth position from the origin in the X direction. In other words, it is indicated that R_x(0) derived based on Expressions (1) to (8) described with reference to FIG. 7 is "4". The number "7" illustrated near the second pixel PixL indicates that the emission line L81 of light emitted from the light emission point LP(0) and reaching the viewpoint EL passes through a second pixel PixL at the seventh position from the origin in the X direction. In other words, it is indicated that L_x(0) derived based on Expressions (1) to (8) described with reference to FIG. 7 is "7". Similarly, for the emission line of other light emitted from the light emission point LP(i) and reaching the viewpoint ER or the viewpoint EL, a number is illustrated near a first pixel PixR or a second pixel PixL.

The values R_x(i) and L_x(i) derived based on Expressions (1) to (8) described with reference to FIG. 7 each derive a coordinate indicating the position of one pixel Pix. In the embodiment, two adjacent pixels Pix are allocated on one emission line of light as described above with reference to FIGS. 4 to 6. The values R_x(i) and L_x(i) each indicate one of the coordinates of the two adjacent pixels Pix. The following describes a method of deriving the other coordinate with reference to FIG. 9.

Figure 9:
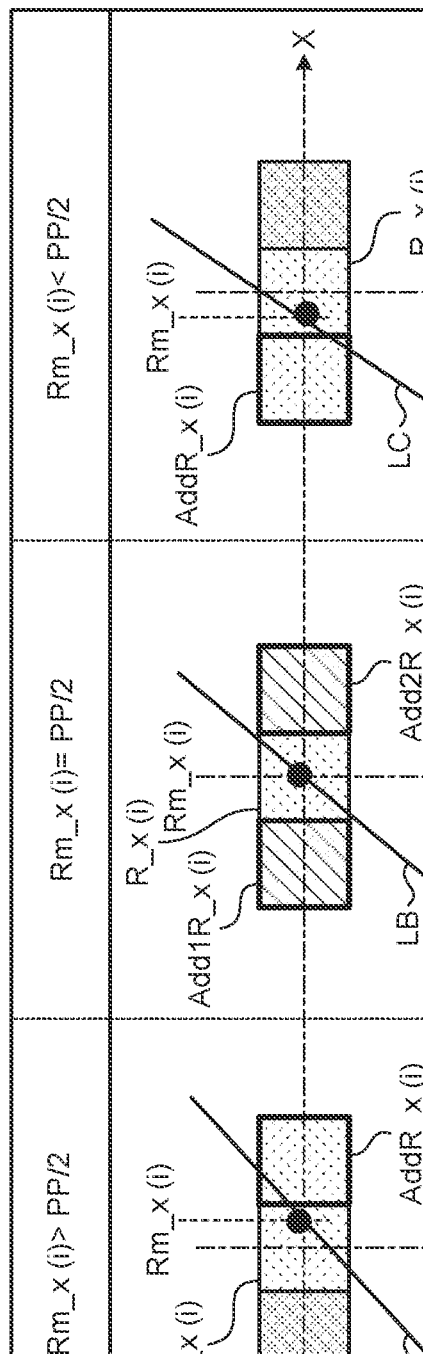
FIG. 9 is a schematic diagram illustrating a method of deriving the coordinates of two pixels allocated on one emission line of light.

FIG. 9 is a schematic diagram illustrating a method of deriving the coordinates of two pixels Pix allocated on one emission line of light. First, Rm_x(i) expressed as in Expression (9) below is calculated.

$$Rm\_x(i)=\text{shift}R\_x(i)-R\_x(i) \quad (9)$$

The other coordinate among the coordinates of the two adjacent pixels Pix can be determined based on the magnitude relation between Rm_x(i) calculated based on Expression (9) and PP/2. The value PP/2 is ½ of the value of the pixel pitch PP.

When the one of the coordinates of the two adjacent pixels Pix is R_x(i) and Rm_x(i) is larger than PP/2, a coordinate obtained by adding 1 to the coordinate indicated by R_x(i) is derived as the other coordinate (AddR_x(i)) among the coordinates of the two adjacent pixels Pix. In FIG. 9, the column "Rm_x(i)>PP/2" indicates that the pixel Pix of R_x(i) and the pixel Pix of AddR_x(i) corresponding to the position "R_x(i)+1" are positioned on the emission line LA of light.

When the one of the coordinates of the two adjacent pixels Pix is R_x(i) and Rm_x(i) is smaller than PP/2, a coordinate obtained by subtracting 1 from the coordinate indicated by R_x(i) is derived as the other coordinate (AddR_x(i)) among the coordinates of the two adjacent pixels Pix. In FIG. 9, the column "Rm_x(i)<PP/2" indicates that the pixel Pix of R_x(i) and the pixel Pix of AddR_x(i) corresponding to the position "R_x(i)−1" are positioned on the emission line LC of light.

When the one of the coordinates of the two adjacent pixels Pix is R_x(i) and Rm_x(i) is equal to PP/2, the other coordinate among the coordinates of the two adjacent pixels Pix may be a value obtained by adding 1 to the coordinate indicated by R_x(i) or may be a value obtained by subtracting 1 from the coordinate indicated by R_x(i). In FIG. 9, the column "Rm_x(i)=PP/2" indicates the pixel Pix of Add1R_x(i) corresponding to the position "R_x(i)−1" and the pixel Pix of Add2R_x(i) corresponding to the position "R_x(i)+ 1". The emission line LB of light in the column "Rm_x(i) =PP/2" in FIG. 9 passes through the pixel Pix of R_x(i). However, light from the light emission point LP is not a completely linear light but is radiated and diffused incoherent light, and thus it is considered that part of light along the emission line LB passes through the pixel Pix of Add1R_x(i) and the pixel Pix of Add2R_x(i). Therefore, it is considered that employing one of the pixel Pix of Add1R_x(i) and the pixel Pix of Add2R_x(i) as the other coordinate (AddR_x(i)) among the coordinates of the two adjacent pixels Pix contributes to improvement of image brightness. In the case of Rm_x(i)=PP/2, a pixel at the other coordinate among the coordinates of the two adjacent pixels Pix may be set as the third pixel PixE.

The case in which the one of the coordinates of the two adjacent pixels Pix is R_x(i) is described above with reference to FIG. 9 and Expression (9). When the one of the coordinates of the two adjacent pixels Pix is L_x(i), Lm_x(i) expressed as in Expression (10) below is calculated first.

$$Lm\_x(i)=\text{shift}L\_x(i)-L\_x(i) \quad (10)$$

The other coordinate among the coordinates of the two adjacent pixels Pix can be determined based on the magnitude relation between Lm_x(i) calculated based on Expression (10) and PP/2, in like manner with the case of the magnitude relation between Rm_x(i) and PP/2. Specifically, when the one of the coordinates of the two adjacent pixels Pix is L_x(i) and Lm_x(i) is larger than PP/2, a coordinate obtained by adding 1 to the coordinate indicated by L_x(i) is derived as the other coordinate (AddL_x(i)) among the coordinates of the two adjacent pixels Pix. When the one of the coordinates of the two adjacent pixels Pix is L_x(i) and Lm_x(i) is smaller than PP/2, a coordinate obtained by subtracting 1 from the coordinate indicated by L_x(i) is derived as the other coordinate (AddL_x(i)) among the coordinates of the two adjacent pixels Pix. When the one of the coordinates of the two adjacent pixels Pix is L_x(i) and Lm_x(i) is equal to PP/2, the other coordinate among the coordinates of the two adjacent pixels Pix may be a value obtained by adding 1 to the coordinate indicated by L_x(i) or may be a value obtained by subtracting 1 from the coordinate indicated by L_x(i). In the case of Lm_x(i)=PP/2, a pixel at the other coordinate among the coordinates of the two adjacent pixels Pix may be set as the third pixel PixE.

Figure 10:
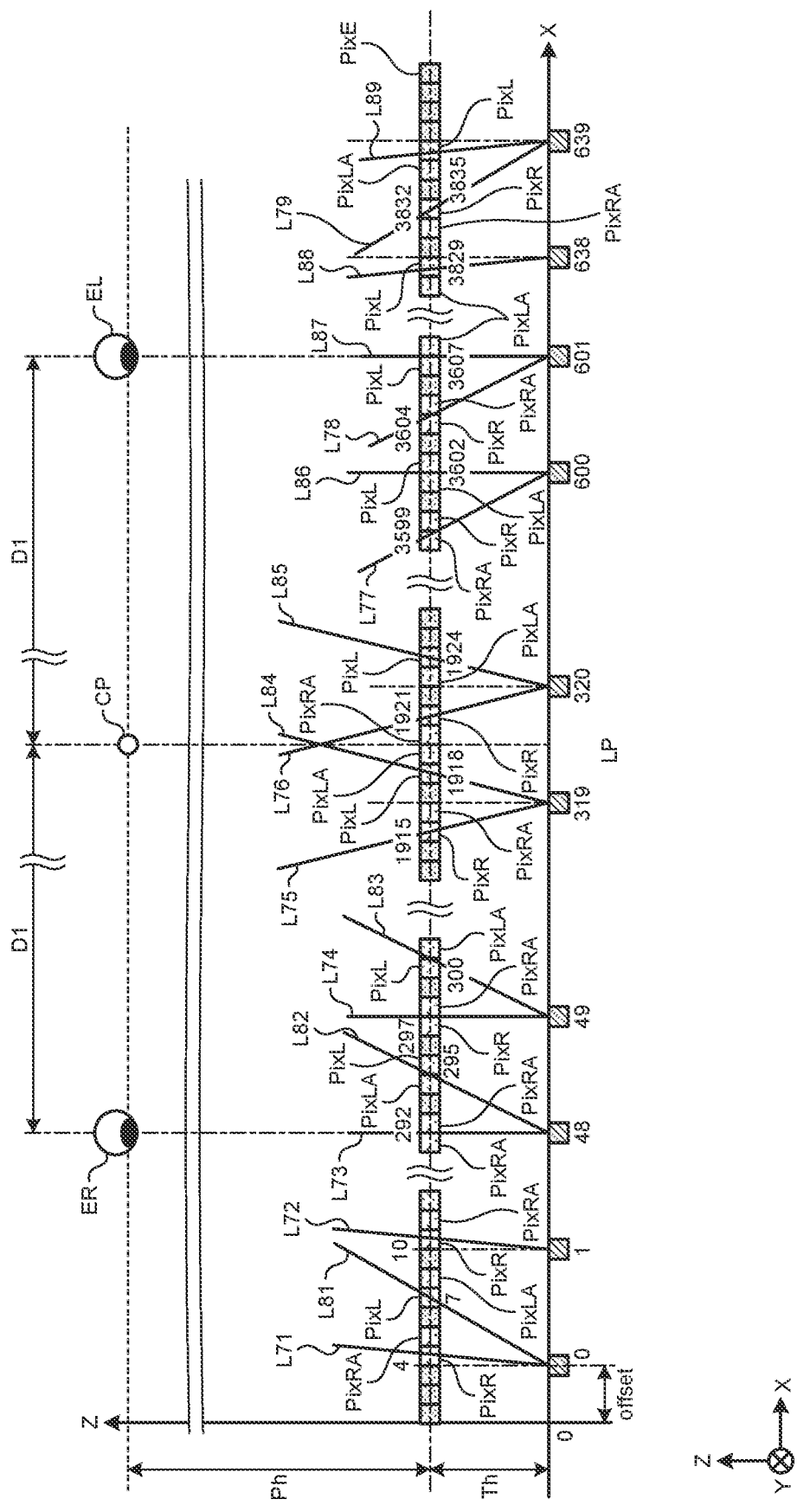
FIG. 10 is a schematic diagram illustrating the positional relation between the following: the first and second pixels controlled in accordance with the coordinates derived based on Expressions (1) to (8) described with reference to FIG. 7; first and second adjacent pixels controlled in accordance with the coordinates derived based on FIG. 9 and Expressions (9) and (10); and the third pixels.

FIG. 10 is a schematic diagram illustrating the positional relation between the following: the first pixels PixR and the second pixels PixL controlled in accordance with R_x(i) and L_x(i) derived based on Expressions (1) to (8) described with reference to FIG. 7; first adjacent pixels PixRA and second adjacent pixels PixLA controlled in accordance with AddR_x(i) and AddL_x(i) derived based on FIG. 9 and Expressions (9) and (10); and the third pixels PixE. When one of the coordinates of two adjacent pixels Pix corresponds to a first pixel PixR (R_x(i)), the first adjacent pixel PixRA corresponds to the other coordinate (AddR_x(i)). When one of the coordinates of two adjacent pixels Pix corresponds to a second pixel PixL (L_x(i)), the second adjacent pixel PixLA corresponds to the other coordinate (AddL_x(i)).

The above description is made on the case in which pixels Pix allocated on the emission line of light between one light emission point LP and one viewpoint (for example, the viewpoint ER or the viewpoint EL) are two pixels Pix adjacent to each other in the X direction. The same control as in the X direction may be performed in the Y direction so that pixels Pix allocated on the emission line of light from one light emission point LP are two pixels Pix adjacent to each other in the Y direction.

Figure 11:
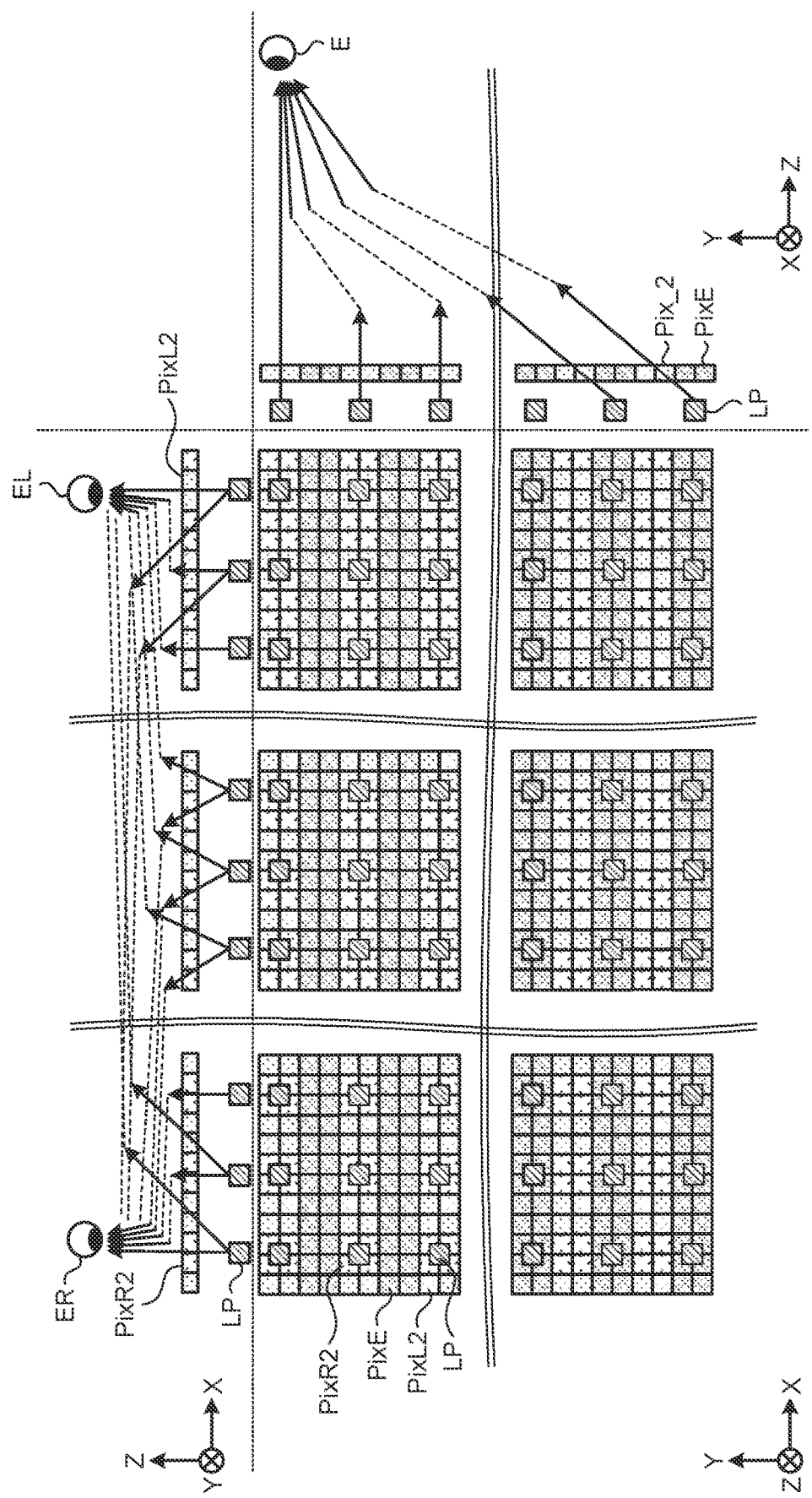
FIG. 11 is a schematic diagram illustrating an example of: the positional relation between light emission points, first pixel regions, and second pixel regions at an X-Z sectional viewpoint; the positional relation between the light emission points, the first pixel regions, and the second pixel regions in a plan view (X-Y plane); and the positional relation between the light emission points and the pixel regions as viewed at a Y-Z sectional viewpoint.

FIG. 11 is a schematic diagram illustrating an example of: the positional relation between light emission points LP, first pixel regions PixR2, and second pixel regions PixL2 when viewed at an X-Z sectional viewpoint; the positional relation between the light emission points LP, the first pixel regions PixR2, and the second pixel regions PixL2 in the plan view (X-Y plane); and the positional relation between the light emission points LP and the second pixels Pix2 as viewed at a Y-Z sectional viewpoint.

Figure 12:
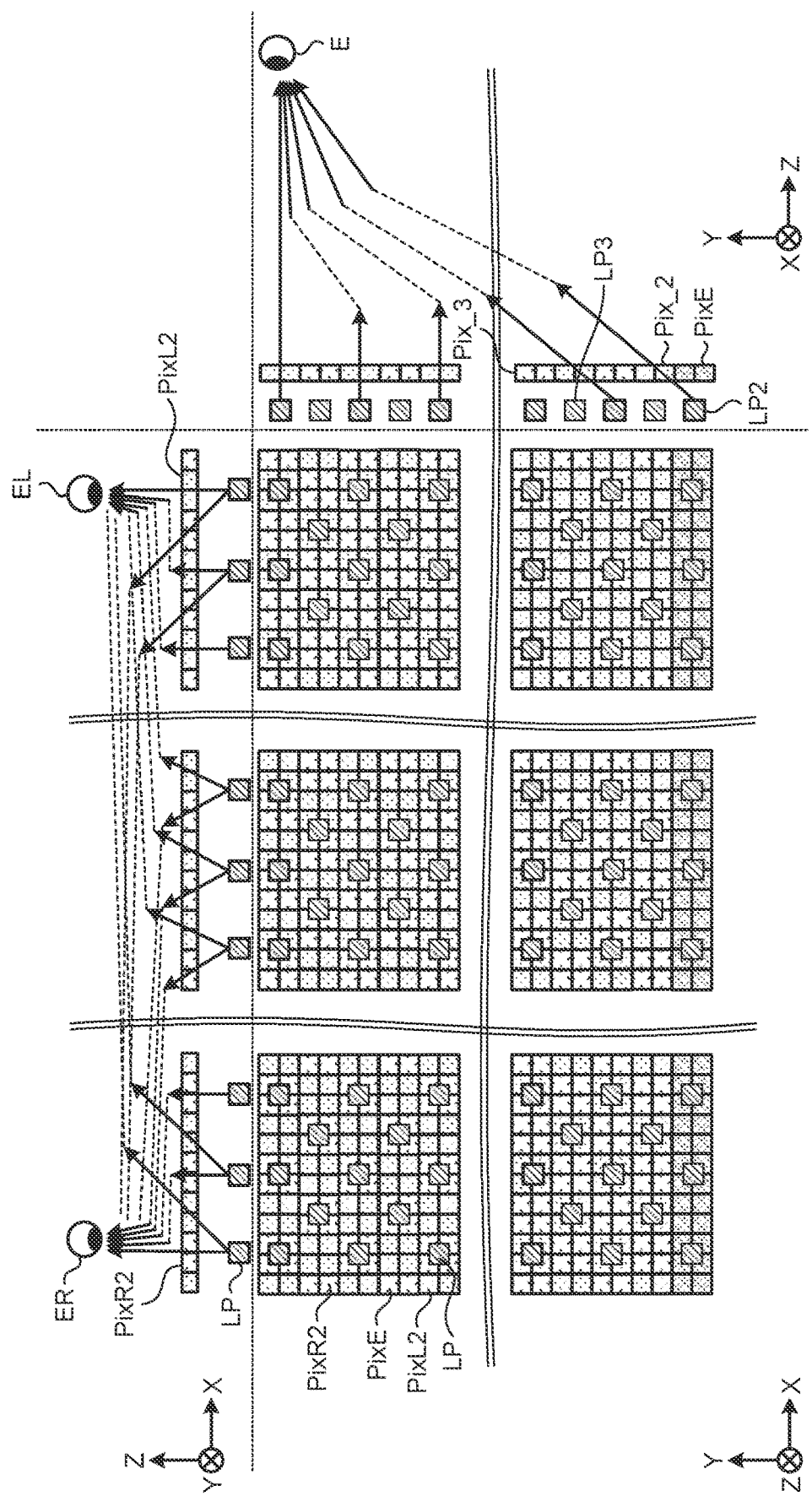
FIG. 12 is a schematic diagram illustrating an example of: the positional relation between light emission points, first pixel regions, and second pixel regions as viewed at the X-Z sectional viewpoint in a configuration in which the light emission points are disposed at staggered positions; the positional relation between the light emission points, the first pixel regions, and the second pixel regions in the plan view (X-Y plane); and the positional relation between the light emission points and the pixel regions as viewed at the Y-Z sectional viewpoint.
Figure 13:
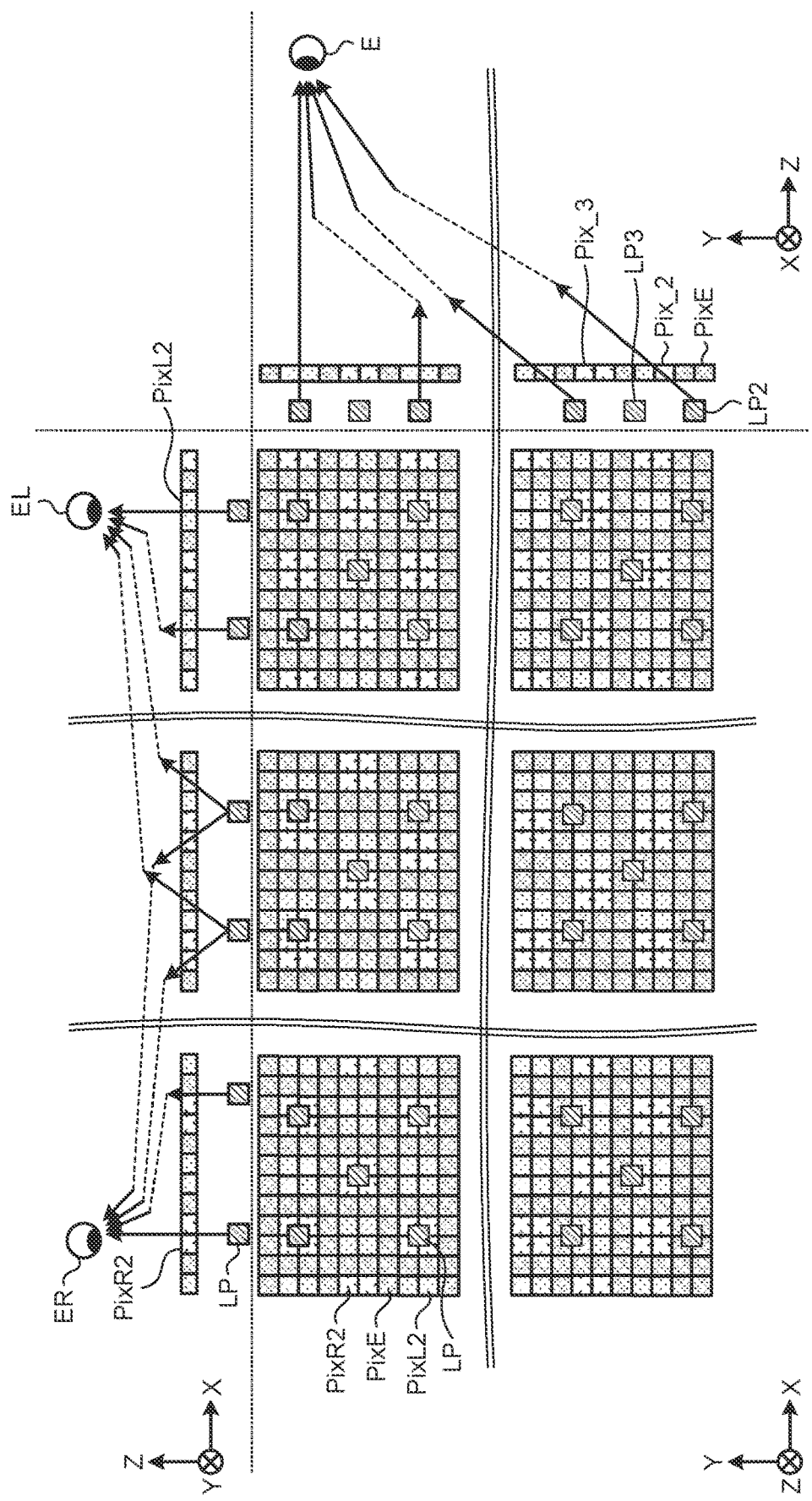
FIG. 13 is a schematic diagram illustrating an example of: the positional relation between light emission points, first pixel regions, and second pixel regions as viewed at the X-Z sectional viewpoint in a configuration in which the relation between the pitch of light emission points and the pitch of pixels is 6:1 in any of the X and Y directions and the light emission points are disposed at staggered positions; the positional relation between the light emission points, the first pixel regions, and the second pixel regions in the plan view (X-Y plane); and the positional relation between the light emission points and the pixel regions as viewed at the Y-Z sectional viewpoint.

As described above, pixels Pix allocated on the emission line of light between one light emission point LP and one viewpoint (for example, the viewpoint ER or the viewpoint EL) are two pixels Pix adjacent to each other in the X direction. In FIG. 11 and FIGS. 12 and 13 to be described later, each first pixel region PixR2 is positioned on the emission line of light between one light emission point LP and the viewpoint ER. Each first pixel region PixR2 includes two pixels Pix adjacent to each other in the X direction. One of the two pixels Pix adjacent to each other in the X direction in each first pixel region PixR2 is the first pixel PixR (refer to FIG. 10). The other of the two pixels Pix adjacent to each other in the X direction in each first pixel region PixR2 is the first adjacent pixel PixRA (refer to FIG. 10). Each second pixel region PixL2 is positioned on the emission line of light between one light emission point LP and the viewpoint EL. Each second pixel region PixL2 includes two pixels Pix adjacent to each other in the X direction. One of the two pixels Pix adjacent to each other in the X direction in each second pixel region PixL2 is the second pixel PixL (refer to FIG. 10). The other of the two pixels Pix adjacent to each other in the X direction in each second pixel region PixL2 is the second adjacent pixel PixLA (refer to FIG. 10).

In the plan view, the first pixel region PixR2 and the second pixel region PixL2 each include two pixels Pix adjacent to each other in the Y direction. In other words, the first pixel region PixR2 and the second pixel region PixL2 are each a 2×2 pixel region in which two pixels Pix are arranged in the X direction and two pixels Pix are arranged in the Y direction in the plan view. Any pixel Pix included in neither the first pixel regions PixR2 nor the second pixel regions PixL2 is set as a third pixel PixE.

The relation between a light emission point LP, a pixel region Pix_2, and a viewpoint E when viewed at the Y-Z sectional viewpoint indicates that the emission line of light between the light emission point LP and the viewpoint E passes through the pixel region including two pixels Pix arranged in the Y direction. The pixel region Pix_2 is the first pixel region PixR2 or the second pixel region PixL2 when viewed at the Y-Z sectional viewpoint. The viewpoint E is the viewpoint ER or the viewpoint EL when viewed at the Y-Z sectional viewpoint. The viewpoint E is the viewpoint ER when the pixel region Pix_2 is the first pixel region PixR2. The viewpoint E is the viewpoint EL when the pixel region Pix_2 is the second pixel region PixL2.

Although FIG. 11 illustrates the exemplary configuration in which the relation between the pitch of light emission points LP and the pitch of pixels Pix is 4:1 in any of the X and Y directions and the light emission points LP are arranged in a matrix having a row-column configuration in the X and Y directions, the configuration of the embodiment is not limited thereto.

FIG. 12 is a schematic diagram illustrating an example of: the positional relation between light emission points LP, first pixel regions PixR2, and second pixel regions PixL2 when viewed at the X-Z sectional viewpoint in a configuration in which the light emission points LP are disposed at staggered positions; the positional relation between the light emission points LP, the first pixel regions PixR2, and the second pixel regions PixL2 in the plan view (X-Y plane); and the positional relation between the light emission points LP and pixel regions Pix_2 and Pix_3 viewed at the Y-Z sectional viewpoint. As illustrated in FIG. 12, when the light emission points LP are disposed at staggered positions, the first pixel regions PixR2 and the second pixel regions PixL2 are disposed at staggered positions as well. In the example illustrated in FIG. 12 as well, pixels Pix allocated on the emission line of light between one light emission point LP and one viewpoint (for example, the viewpoint ER or the viewpoint EL) are two pixels Pix adjacent to each other in each of the X and Y directions.

Each pixel region Pix_3 viewed at the Y-Z sectional viewpoint illustrated in FIG. 12 is a first pixel region PixR2 or a second pixel region PixL2 viewed at the Y-Z sectional viewpoint. The light emission point LP2 is a light emission point LP included in light emission points LP disposed at staggered positions in the plan view and is included in a line composed of light emission points LP disposed on a relatively front side when viewed at the Y-Z sectional viewpoint (when viewing in front-back direction of the paper). The light emission point LP3 is a light emission point LP included in the light emission points LP disposed at staggered positions in the plan view and is included in a line composed of light emission points LP positioned on a relatively back side when viewed at the Y-Z sectional viewpoint (when viewing in front-back direction of the paper). FIG. 12 exemplarily illustrates a state in which light from the light emission point LP2 reaches the viewpoint E through a pixel region Pix_2. In this state, the emission line of light between the light emission point LP3 and the viewpoint E passes through a pixel Pix at the position of a pixel region Pix_3 in the Y direction. In the examples illustrated in FIGS. 11 and 12, the relation between the pitch of light emission points LP and the pitch of pixels Pix is 4:1 in any of the X and Y directions, and each pixel belongs to the first pixel region PixR2 or the second pixel region PixL2. When the display pixel determination method described above with reference to FIGS. 7 to 9 is used, a pixel belongs to both the first pixel region PixR2 and the second pixel region PixL2 in some cases. In such a case, the pixel is synonymous with the pixel PixQ in FIG. 4, and whether the pixel belongs to the first pixel region PixR2 or the second pixel region PixL2 is determined by the signal processor. As in FIG. 4, the determination may be performed by determining that the pixel is a pixel belonging to an image corresponding to a viewpoint at a farther position when viewed from the pixel or by determining that the pixel is a pixel belonging to an image corresponding to a viewpoint at a closer position when viewed from the pixel.

FIG. 13 is a schematic diagram illustrating an example of: the positional relation between light emission points LP, first pixel regions PixR2, and second pixel regions PixL2 when viewed at the X-Z sectional viewpoint in a configuration in which the relation between the pitch of light emission points LP and the pitch of pixels Pix is 6:1 in any of the X and Y directions and the light emission points LP are disposed at staggered positions; the positional relation between the light emission points LP, the first pixel regions PixR2, and the second pixel regions PixL2 in the plan view (X-Y plane); and the positional relation between the light emission points LP and pixel regions Pix_2 and Pix_3 when viewed at the Y-Z sectional viewpoint. In the example illustrated in FIG. 13, since the relation between the pitch of light emission points LP and the pitch of pixels Pix is 6:1 in any of the X and Y directions, the method of controlling pixels Pix is the same as in the case described above with reference to FIG. 12 except that the number of pixels Pix as third pixels PixE is larger than in the case (4:1) illustrated in FIG. 12.

Figure 14:
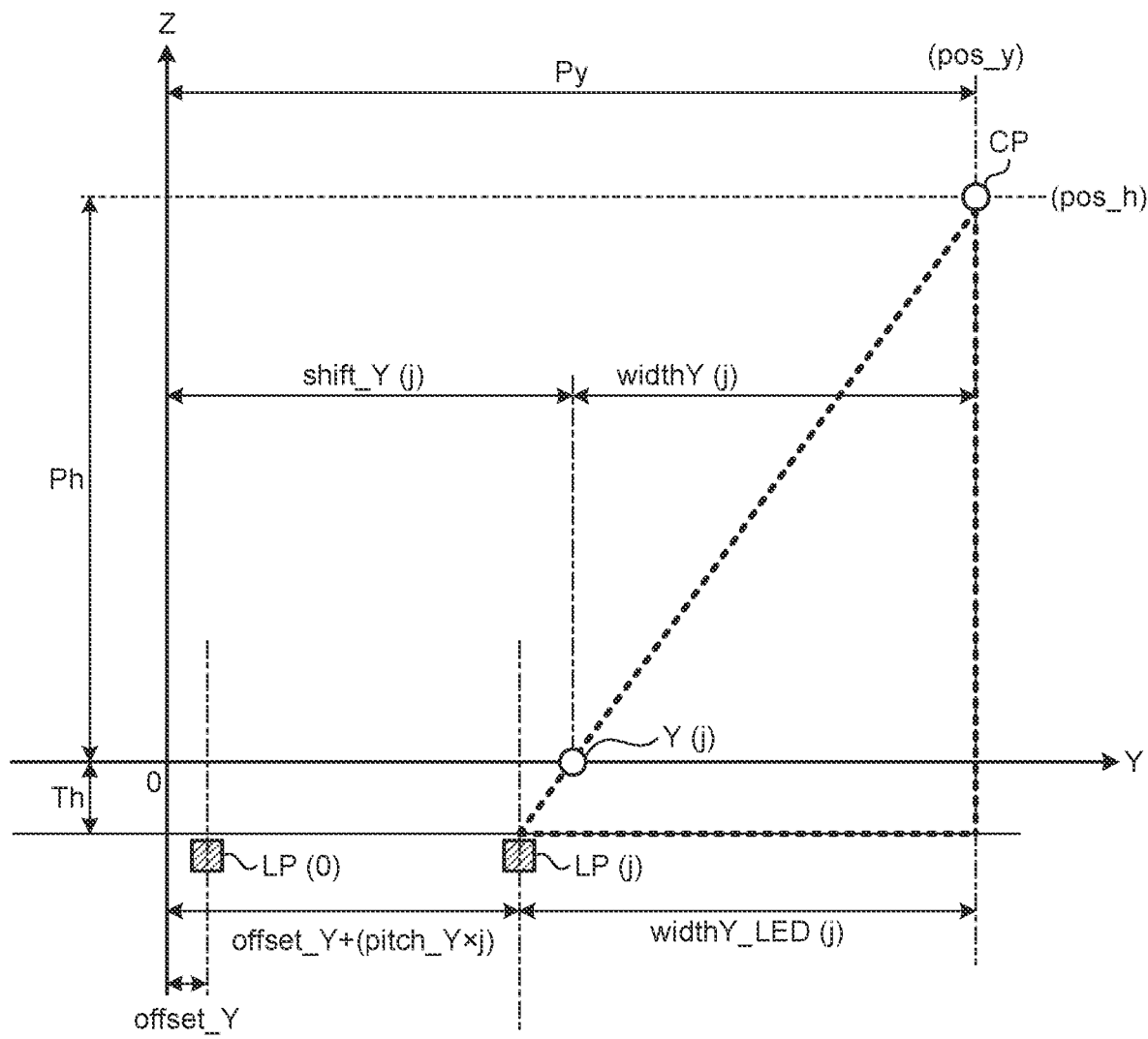
FIG. 14 is a diagram illustrating various parameters related to determination of the coordinate in the Y direction of a pixel positioned on the emission line of light between the light emission point of light from the (j+1)-th light source with respect to the origin in the Y direction and each viewpoint.
Figure 15:
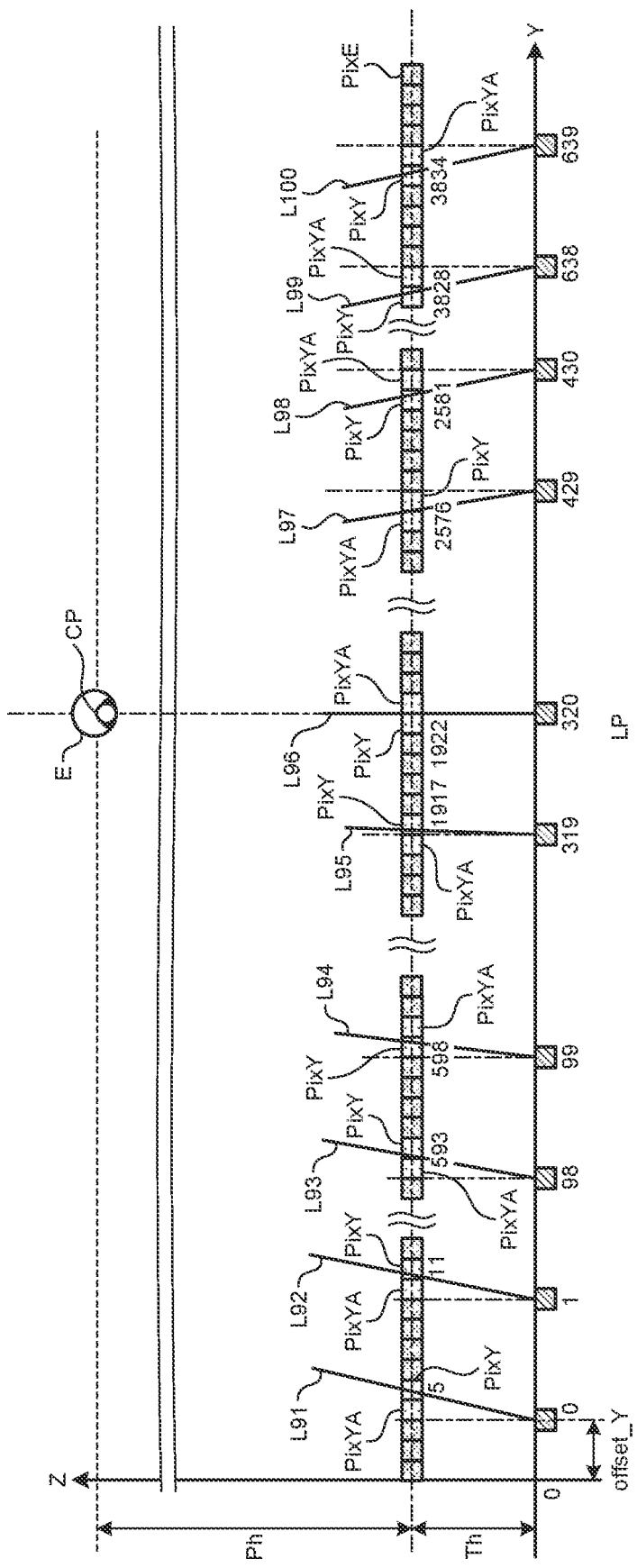
FIG. 15 is a schematic diagram illustrating the positional relation between the following: pixels controlled in accordance with the coordinate (Y(j)) derived based on Expressions (11) to (14) described with reference to FIG. 14; adjacent pixels controlled in accordance with a coordinate (AddY(j)); and third pixels PixE.

The following describes, with reference to FIGS. 14 and 15, matters related to arrangement of pixels Pix in the Y direction in drive control performed on each pixel Pix in accordance with the relative positional relation between a viewpoint and a light emission point.

FIG. 14 is a diagram illustrating various parameters related to determination of the coordinate Y(j) in the Y direction of a pixel Pix positioned on the emission line extending from the light emission point LP(j) that is the (j+1)-th light emission point counted from the origin in the Y direction to each of the viewpoints ER and EL. The coordinate in the Y direction of any of first pixels PixR (refer to FIGS. 8 and 10) and second pixels PixL (refer to FIGS. 8 and 10) is the coordinate Y(j).

The light emission point LP(0) illustrated in FIG. 14 indicates the emission start point of light from a light source point (for example, a light emission point 32) disposed at the closest (first) position to the origin in the Y direction. The light emission point LP(j) indicates the emission start point of light from a light source point disposed at the (j+1)-th closest position to the origin in the Y direction. For example, in a case of j=1, the light emission point LP(1) indicates the emission start point of light from a light source point disposed at the closest position next to the light emission point LP(0) to the origin in the Y direction, which means that the light emission point LP(1) indicates the secondary closest position. Thus, j is an integer equal to or larger than zero. The light emission point LP(0) and the light emission point LP(j) in FIG. 14 are the light emission point LP(0) or the light emission point LP(i) in FIG. 7. The light emission point LP(0) and the light emission point LP(i) in FIG. 7 are the light emission point LP(0) or the light emission point LP(j) in FIG. 14. Thus, the light emission points LP are two-dimensionally disposed in the plan view as described above with reference to FIGS. 11 to 13 and thus have X and Y coordinates.

In FIG. 14, the distance in the Y direction between the origin and the light emission point LP(0) is denoted by "offset_Y". The distance in the Y direction between the origin and the light emission point LP(j) can be expressed as "offset_Y+(pitch_Y×j)". The magnitude of the value of "pitch_Y" corresponds to the interval between the central lines in the Y direction of two light emission points LP adjacent to each other in the Y direction. The values "offset_Y" and "offset_Y+(pitch_Y×j)" are values determined in advance in accordance with the design of the display device 1 and are parameters that can be referred in calculation related to determination of the coordinate Y(j) in the Y direction.

The magnitude of the distance Ph described above with reference to FIG. 3 and illustrated in FIG. 14 corresponds to the magnitude of the value of pos_h. The magnitude of a distance Py illustrated in FIG. 14 corresponds to the magnitude of the value of pos_y. The distance in the Z direction between the origin and each of the light emission point LP(0) and the light emission point LP(j) is the distance Th described above. The values of pos_h and pos_y can be acquired by the image capturer 2 and the distance measurer 3.

Hereinafter, the distance in the Y direction between the origin and the coordinate Y(j) is denoted by shift Y(j). The distance in the Y direction between the coordinate Y(j) and the middle point CP is denoted by widthY(j). The distance in the Y direction between the light emission point LP(j) and the middle point CP is denoted by widthY_LED(j).

The value widthY_LED(j) can be expressed as Expression (11) below.

$$\text{widthY\_LED}(j) = \text{pos\_}y - \{\text{offset\_}Y + (\text{pitch\_}Y \times j)\} \quad (11)$$

The values widthY(j) can be expressed as Expression (12) below.

$$\text{widthY}(j) = \text{widthY\_LED}(j) \times \text{pos\_}h/(\text{pos\_}h + Th) \quad (12)$$

The value shift Y(j) can be expressed as Expression (13) below.

$$\text{shift\_}Y(j) = \text{pos\_}y - \text{widthY}(j) \quad (13)$$

The value Y(j) can be expressed as Expression (14) below. The value PPY is the width of each pixel Pix in the Y direction.

$$Y(j) = \text{int}(\text{shift\_}Y(i)/PPY) \quad (14)$$

The value Y(j) derived based on Expressions (11) to (14) described with reference to FIG. 14 derives a coordinate indicating the position of one pixel Pix. In the embodiment, two pixels Pix adjacent to each other in the Y direction are allocated on one emission line of light as described above with reference to FIGS. 11 to 13. The value Y(j) indicates one of the coordinates of the two adjacent pixels Pix. The following describes a method of deriving the other coordinate.

Ideas related to the method of deriving the other coordinate, which is not the one coordinate (Y(j)), of the two pixels Pix adjacent to each other in the Y direction are basically the same as ideas related to the method of deriving the other coordinate, which is not the one coordinate (R_x(i) or L_x(i)), of two pixels Pix adjacent to each other in the X direction. Specifically, m_Y(j) expressed as in Expression (15) below is calculated first.

$$m\_Y(j) = \text{shift\_}Y(j) - Y(j) \quad (15)$$

The other coordinate among the coordinates of the two pixels Pix adjacent to each other in the Y direction can be determined based on the magnitude relation between m_Y(j) calculated based on Expression (15) and PPY/2. When the one of the coordinates of the two adjacent pixels Pix is Y(j) and m_Y(j) is larger than PPY/2, a coordinate obtained by adding 1 to the coordinate indicated by Y(j) is derived as the other coordinate (Add Y(j)) among the coordinates of the two pixels Pix adjacent to each other in the Y direction. When the one of the coordinates of the two adjacent pixels Pix is Y(j) and m_Y(j) is smaller than PPY/2, a coordinate obtained by subtracting 1 from the coordinate indicated by Y(j) is derived as the other coordinate (Add Y(j)) among the coordinates of the two pixels Pix adjacent to each other in the Y direction. When the one of the coordinates of the two adjacent pixels Pix is Y(j) and m_Y(j) is equal to PPY/2, the other coordinate among the coordinates of the two adjacent pixels Pix may be a value obtained by adding 1 to the coordinate indicated by Y(j) or may be a value obtained by subtracting 1 from the coordinate indicated by Y(j). In the case of Y(j)=PPY/2, a pixel at the other coordinate among the coordinates of the two adjacent pixels Pix may be set as a third pixel PixE.

FIG. 15 is a schematic diagram illustrating the positional relation between the following: pixels PixY controlled in accordance with Y(j) derived based on Expressions (11) to (14) described with reference to FIG. 14; adjacent pixels PixYA controlled in accordance with AddY(j); and third pixels PixE. The example illustrated in FIG. 15 corresponds to an exemplary configuration in which 640 light emission points LP are arranged in the Y direction, and the value "0" in the parentheses of the light emission point LP(0) and some values (1, 98, 99, 319, 320, 429, 430, 638, and 639) of the index j of the light emission point LP(j) are illustrated in the horizontal direction. In description with reference to FIG. 15, the light emission point LP means the light emission point LP(0) or the light emission point LP(j). Accordingly, it is indicated that, among pixels Pix arranged in the Y direction from the origin as a starting point, which pixel Pix is positioned on the emission line of light from the light emission point LP to the viewpoint E. For example, the number "5" illustrated near the pixel PixY indicates that the emission line L91 of light emitted from the light emission point LP(0) and reaching the viewpoint ER passes through the pixel PixY at the fifth position from the origin in the X direction. In other words, it is indicated that Y(0) derived based on Expressions (11) to (14) described with reference to FIG. 14 is "5". Similarly, for the emission line of light emitted from the light emission point LP(j) and reaching the viewpoint E, a number is illustrated near a pixel PixY. An adjacent pixel PixYA adjacent to a pixel PixY corresponds to the other coordinate (AddY(j)) when one of the coordinates of two adjacent pixels Pix is a pixel PixY ((j)).

Coordinate derivation based on Expressions (1) to (15) is performed by the signal processor 10. As a specific example, an algorithm including calculation corresponding to Expressions (1) to (15) is implemented as an algorithm for the coordinate derivation on the image outputting circuit 12. The image outputting circuit 12 determines pixel signals to be provided to pixels Pix based on the derived coordinates.

Figure 16:
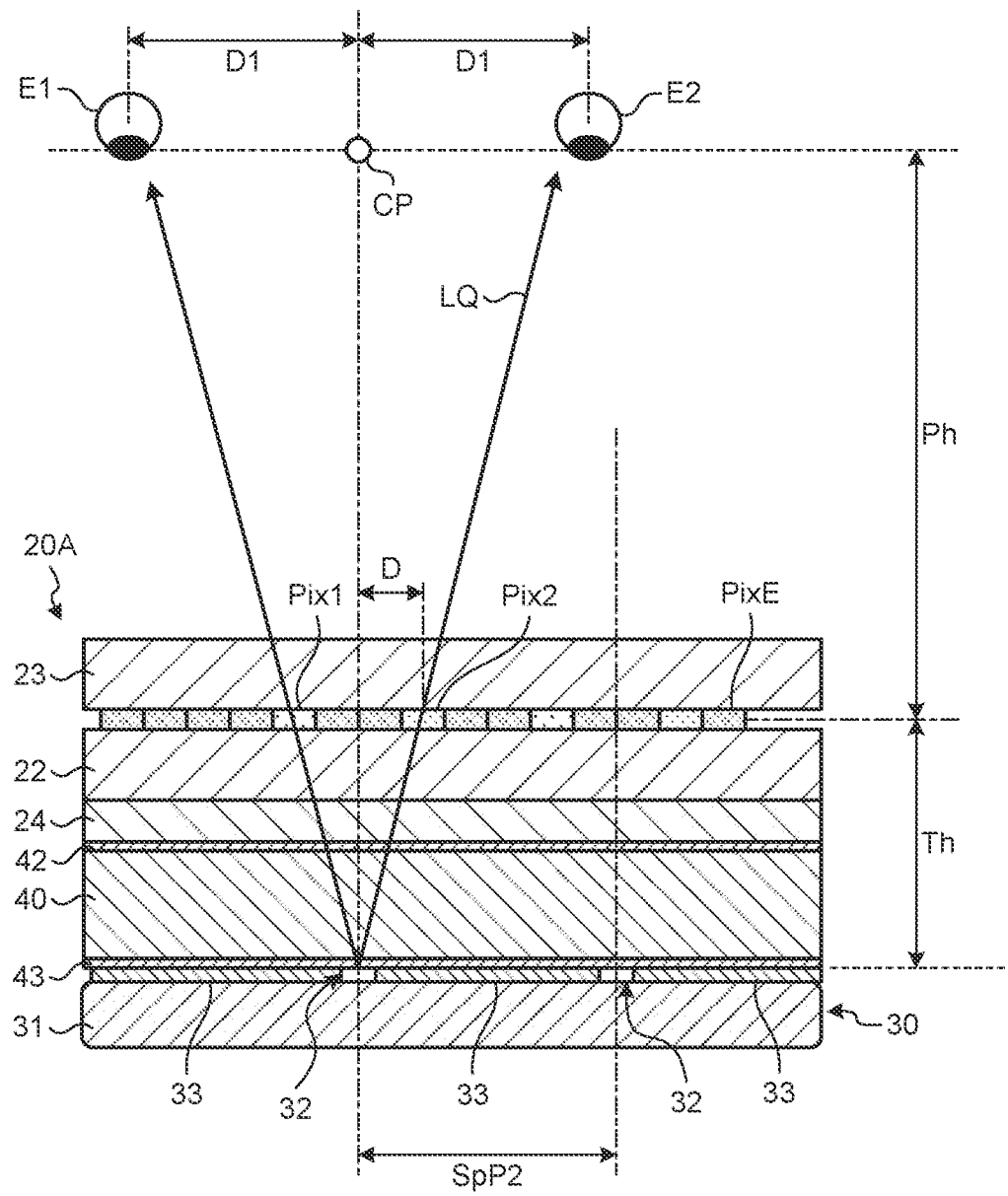
FIG. 16 is a schematic diagram illustrating a distance Th determined so that the ratio of the value of a distance D1 to the summed value of a distance Ph and the distance Th is equal to the ratio of the value of the distance Th to the value of a distance D.

The following describes the method of determining the distance Th at designing of the display device with reference to FIG. 16.

FIG. 16 is a schematic diagram illustrating the distance Th determined so that the ratio of the value of the distance D1 to the summed value of the distance Ph and the distance Th is equal to the ratio of the value of the distance Th to the value of a distance D. The distance D in FIG. 16 is the distance in the X direction from an intersection of the central line in the Z direction of a pixel Pix and the emission line LQ to the middle point CP. The emission line LQ is the emission line of light reaching a viewpoint (for example, the second viewpoint E2) at the distance D1 in the X direction to the middle point CP at a position separated from a pixel Pix by the distance Ph in the Z direction and is the emission line of light emitted from a light emission point LP (for example, a light emission point 32) at a position opposite to the middle point CP in the Z direction. In FIG. 16, Expression (16) of ratios below is satisfied. In Expression (16), D represents the value of the distance D.

$$(Th + \text{pos\_}h):D1 = Th:D \quad (16)$$

Expression (17) below is satisfied based on Expression (16) described above.

$$D \times (Th + \text{pos\_}h) = D1 \times Th \quad (17)$$

Expression (18) below is satisfied based on Expression (17) described above.

$$(D1 - D) \times Th = D \times \text{pos\_}h \quad (18)$$

Expression (19) below is satisfied based on Expression (18) described above. As in Expression (19), the value of the distance Th can be derived based on the value (pos_h) of the distance Ph, the value of the distance D1, and the value of the distance D.

$$Th = \text{pos\_}h \times D/(D1 - D) \quad (19)$$

The value of the distance Ph can be the value of a distance typically assumed as the distance between the display device 1 and a user viewing an image on the display device 1. For example, when the display device 1 is provided in a portable terminal device such as a smartphone, for example, 30 cm (300 mm) is assumed as the distance Ph. The value of the distance D1 can be ½ of the average value of the distance (distance D2) between the eyes of a human. As a specific example, D2=62.5 mm, in other words, D1=31.25 mm is assumed. The value of the distance Ph and the value of the distance D1 are merely exemplary and the present disclosure is not limited thereto, and thus the values are changeable as appropriate.

An assumed value can be derived for the value of the distance D in accordance with the relation between the pitch (for example, the light emission point pitch SpP or the light emission point pitch SpP2) of light emission points LP and the pixel pitch PP. For example, when the relation between the pitch of light emission points LP and the pitch of pixels Pix is 6n:1, the distance D is assumed to be about 1.5n times longer than the pixel pitch PP {D=1.5 nPP} as illustrated in FIG. 16. When the relation between the pitch of light emission points LP and the pitch of pixels Pix is 4n:1, the distance D is assumed to be substantially equal to the pixel pitch PP (D=nPP). Thus, the distance Th can be derived based on the value of the distance Ph and the value of the distance D1 assumed as described above, the relation between the pitch of light emission points LP and the pitch of pixels Pix, and the pixel pitch PP. The thickness in the Z direction of any component included in the spacer 40 may be adjusted in accordance with the distance Th derived in this manner, thereby obtaining the display panel 20 in accordance with the distance Th corresponding to the assumed condition. Depending on an actual use situation and the individual difference among users, the distance Ph and the distance D1 are likely to be different from the above-described values defined in designing in some degree, but a display device manufactured under the above-described design concept has redundancy corresponding to the difference in such usage.

The derivation of the value of the distance Th based on Expression (19) does not consider light refraction that occurs at the interface between the display panel 20 and air interposed between the display panel 20 and the user. Thus, it is possible to more highly accurately reduce crosstalk by determining the distance Th based on further consideration of influence of such refraction on the emission line of light.

As described above, according to the embodiment, the display device 1 includes a liquid crystal display panel (for example, the display panel 20, the display panel 20A, or the display panel 20B) provided with a plurality of pixels (pixels Pix), and a light source (for example, the light source 30) provided with a plurality of light emission points (light emission points LP), the ratio of the pitch (pixel pitch PP) of the pixels arranged in a predetermined direction (for example, the X direction) to the pitch (light emission point pitch SpP or light emission point pitch SpP2) of the light emission points arranged in the predetermined direction is 1:4n or 1:6n, and n is a natural number. In the display device in which the ratio is satisfied, when intersections at which the emission lines of light from light emission points to each of the two eyes (for example, the first viewpoint E1 and the second viewpoint E2) of a user viewing an image pass through pixels are viewed in the plan view, the pitch of the intersections arranged in the predetermined direction is significantly larger than the pitch of the pixels as exemplarily illustrated in, for example, FIGS. 4 to 6. In other words, light rays traveling toward different viewpoints hardly pass through the same pixel of the liquid crystal display panel in principle. Thus, crosstalk is reduced by the simple way of setting 1:4n or 1:6n to the ratio of the pitch of pixels arranged in the predetermined direction to the pitch of light emission points arranged in the predetermined direction.

The position of each light emission point (light emission point LP) is the position of a hole (light emission point 32) provided in a light-shielding member (the light-shielding member 33) covering the surface light source (surface light source 31). With this configuration, a plurality of light emission points can be more easily provided.

The distance (distance Th) between the liquid crystal display panel (for example, the display panel 20, the display panel 20A, or the display panel 20B) and the light source (for example, the light source 30) that face each other corresponds to a distance assumed as the distance (pos_h) between the liquid crystal display panel and a user viewing an image on the liquid crystal display panel, a distance assumed as the distance (the distance D2) between two adjacent viewpoints (for example, the first viewpoint E1 and the second viewpoint E2) arranged in the predetermined direction (for example, the X direction), and the ratio (1:4n or 1:6n) of the pitch (pixel pitch PP) of the pixels (pixels Pix) arranged in the predetermined direction to the pitch (for example, the light emission point pitch SpP or the light emission point pitch SpP2) of the light emission points (light emission point LP) arranged in the predetermined direction. With this configuration, the distance (distance Th) can be easily derived.

The display device 1 further includes an acquirer (for example, the image capturer 2 and the distance measurer 3) configured to acquire information indicating the positions of the two viewpoints (for example, the first viewpoint E1 and the second viewpoint E2) relative to the liquid crystal display panel (for example, the display panel 20, the display panel 20A, or the display panel 20B), and a signal processor (for example, the signal processor 10) configured to cause, based on the information, the liquid crystal display panel to perform display with which different images can be viewed at the two respective viewpoints.

With this configuration, individual images can be output to the two viewpoints.

Two pixels (for example, the first pixel Pix1 and the second pixel Pix2) used for image output to one viewpoint (for example, the first viewpoint E1 or the second viewpoint E2) are arranged continuously in the predetermined direction (for example, the X direction). With this configuration, a brighter image can be output.

The above-described configuration of the display device 1 is merely an example of the embodiment and the present disclosure is not limited thereto. For example, a point light source may be provided at the position of each light emission point LP. Specifically, the specific configuration of each rectangle representing a light emission point LP in FIGS. 7, 8, and 10 to 13 may be the point light source. The point light source is, for example, a minute LED called a mini LED or a micro LED, but the present disclosure is not limited thereto and the point light source may be achieved by another light-emitting element (for example, an organic light emitting diode (OLED)) or the like. When the point light source is provided at the position of each light emission point LP, the light source 30 has, for example, a configuration including a plurality of point light sources and a substrate on which the point light sources are mounted.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:
a liquid crystal display panel provided with a plurality of pixels;
a light source provided with a plurality of light emission points, wherein
a ratio of a pitch of the pixels arranged in a predetermined direction to a pitch of the light emission points arranged in the predetermined direction is 1:4n or 1:6n, and
n is a natural number,
a distance between the liquid crystal display panel and the light source corresponds to
a distance assumed as a distance between the liquid crystal display panel and a user visually recognizing an image on the liquid crystal display panel,
a distance assumed as a distance between two viewpoints adjacent to each other in the predetermined direction, and
the ratio of the pitch of the pixels arranged in the predetermined direction to the pitch of the light emission points arranged in the predetermined direction,
an acquiring processor configured to acquire information indicating the positions of the two viewpoints relative to the liquid crystal display panel; and
a signal processor configured to cause, based on the information, the liquid crystal display panel to perform display with which different images are allowed to be viewed at the two respective viewpoints.

2. The display device according to claim 1, wherein a position of each light emission point is a position of a hole provided in a light-shielding member covering a surface light source.

3. The display device according to claim 1, wherein the position of each light emission point is a position at which a point light source is provided.

4. The display device according to claim 1, further comprising:
an acquirer configured to acquire the information indicating the positions of the two viewpoints relative to the liquid crystal display panel.

5. The display device according to claim 4, wherein two pixels used for image output to one viewpoint are arranged continuously in the predetermined direction.

6. The display device according to claim 1, further comprising a polarization layer between the plurality of pixels and the light source,
wherein the plurality of light emission points overlap a main surface of the polarization layer.

7. A display device comprising:
a liquid crystal display panel provided with pixels and a polarization layer; and
a light source provided with light emission points overlapping a main surface of the polarization layer, wherein
a ratio of a pitch of the pixels arranged in a first direction to a pitch of the light emission points arranged in the first direction is 1:4n or 1:6n, and
n is a natural number,
a distance between the liquid crystal display panel and the light source corresponds to
a distance assumed as a distance between the liquid crystal display panel and a user visually recognizing an image on the liquid crystal display panel,
a distance assumed as a distance between two viewpoints adjacent to each other in the first direction, and
the ratio of the pitch of the pixels arranged in the first direction to the pitch of the light emission points arranged in the first direction,
an acquiring processor configured to acquire information indicating the positions of the two viewpoints relative to the liquid crystal display panel; and
a signal processor configured to cause, based on the information, the liquid crystal display panel to perform display with which different images are allowed to be viewed at the two respective viewpoints.

8. The display device according to claim 7, wherein the polarization layer is between the plurality of pixels and the light source.

9. The display device according to claim 7, wherein the light source has a light-shielding member,
the light-shielding member has holes, and
the light emission points correspond to the holes.

10. The display device according to claim 9, wherein the light-shielding member is located in a liquid crystal display panel side of the light source.

11. The display device according to claim 7, wherein the light source has point light sources, and
positions of the light emission points correspond to positions of the point light sources.

12. A display device comprising:
a liquid crystal display panel provided with pixels; and
a light source provided with light emission points, wherein
a ratio of a pitch of the pixels arranged in a first direction to a pitch of the light emission points arranged in the first direction is 1:4n, and
n is a natural number,
a distance between the liquid crystal display panel and the light source corresponds to
a distance assumed as a distance between the liquid crystal display panel and a user visually recognizing an image on the liquid crystal display panel,
a distance assumed as a distance between two viewpoints adjacent to each other in the first direction, and
the ratio of the pitch of the pixels arranged in the first direction to the pitch of the light emission points arranged in the first direction,
an acquiring processor configured to acquire information indicating the positions of the two viewpoints relative to the liquid crystal display panel; and
a signal processor configured to cause, based on the information, the liquid crystal display panel to perform display with which different images are allowed to be viewed at the two respective viewpoints.

13. The display device according to claim 12, wherein the ratio of the pitch of the pixels to the pitch of the light emission points is 1:4.

14. The display device according to claim 12, wherein the light source has a light-shielding member,
the light-shielding member has holes, and
the light emission points correspond to the holes.

15. The display device according to claim 14, wherein the light-shielding member is located in a liquid crystal display panel side of the light source.

16. The display device according to claim 12, wherein the light source has point light sources, and
positions of the light emission points correspond to positions of the point light sources.

* * * * *